(12) United States Patent
Kobayashi et al.

(10) Patent No.: US 11,146,692 B2
(45) Date of Patent: Oct. 12, 2021

(54) IMAGE READING APPARATUS HAVING ERROR SPECIFICATION AND CONTROL METHOD OF IMAGE READING APPARATUS

(71) Applicant: CANON KABUSHIKI KAISHA, Tokyo (JP)

(72) Inventors: Nobutsune Kobayashi, Yokohama (JP); Yoichiro Makino, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/931,661

(22) Filed: May 14, 2020

(65) Prior Publication Data

US 2020/0374407 A1 Nov. 26, 2020

(30) Foreign Application Priority Data

May 22, 2019 (JP) .............................. JP2019-096230

(51) Int. Cl.
*H04N 1/00* (2006.01)
*H04N 1/393* (2006.01)
(Continued)

(52) U.S. Cl.
CPC ..... *H04N 1/00037* (2013.01); *H04N 1/00013* (2013.01); *H04N 1/00074* (2013.01);
(Continued)

(58) Field of Classification Search
CPC ........... H04N 1/00013; H04N 1/00037; H04N 1/0005; H04N 1/00074; H04N 1/00076; H04N 1/00079; H04N 1/00135; H04N 1/00137; H04N 1/00161; H04N 1/00164; H04N 1/00204; H04N 1/00209;
(Continued)

(56) References Cited

U.S. PATENT DOCUMENTS 9,930,210 B2 * 3/2018 Hanano .............. H04N 1/00477
2002/0054341 A1 * 5/2002 Suzuki ............... H04N 1/32614
358/1.15

(Continued)

FOREIGN PATENT DOCUMENTS

JP 2008-124648 A 5/2008

*Primary Examiner* — Scott A Rogers
(74) *Attorney, Agent, or Firm* — Venable LLP

(57) ABSTRACT

An image reading apparatus is connectable to an information processing apparatus having predetermined software and includes at least a processor and at least a memory coupled to the processor and having stored thereon instructions. The instructions are executed by the processor to act as a reading unit to perform scan processing for a document in a case where a read command transmitted from the information processing apparatus by user operation to the predetermined software is received, a detection unit to detect an error in the image reading apparatus, and a transmission unit to execute image data transmission processing for transmitting image data corresponding to the detected error in a case where the detected error is a first error, and execute error transmission processing different from the image data transmission processing in a case where the detected error is a second error.

21 Claims, 26 Drawing Sheets

(51) Int. Cl.
*H04N 1/10* (2006.01)
*H04N 1/32* (2006.01)
(52) U.S. Cl.
CPC ..... *H04N 1/00236* (2013.01); *H04N 1/00811* (2013.01); *H04N 1/00814* (2013.01); *H04N 1/00824* (2013.01); *H04N 1/1013* (2013.01); *H04N 1/32101* (2013.01); *H04N 1/3935* (2013.01); *H04N 2201/0081* (2013.01)
(58) Field of Classification Search
CPC ........... H04N 1/00214; H04N 1/00222; H04N 1/00225; H04N 1/00228; H04N 1/00236; H04N 1/00241; H04N 1/00408; H04N 1/0044; H04N 1/00469; H04N 1/00519; H04N 1/00559; H04N 1/00814; H04N 1/00824; H04N 1/0249; H04N 1/047; H04N 1/1013–1056; H04N 2201/02404; H04N 2201/0442
See application file for complete search history.

(56) References Cited

U.S. PATENT DOCUMENTS

| | | | |
|---|---|---|---|
| 2005/0125576 A1* | 6/2005 | Yashiki | H04N 1/00241 |
| | | | 710/62 |
| 2009/0237741 A1* | 9/2009 | Kurahashi | H04N 1/3263 |
| | | | 358/406 |
| 2018/0241895 A1* | 8/2018 | Yamasaki | H04N 1/1043 |
| 2019/0260892 A1* | 8/2019 | Kawai | G03G 15/221 |
| 2020/0045201 A1* | 2/2020 | Nishida | H04N 1/00037 |

\* cited by examiner

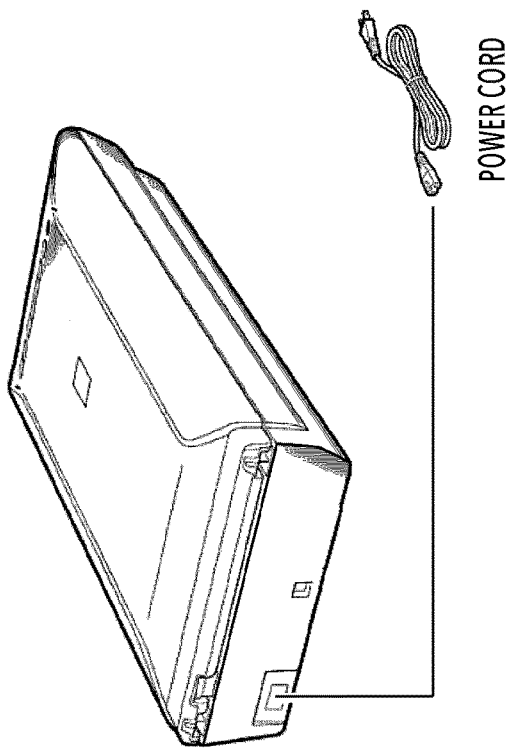
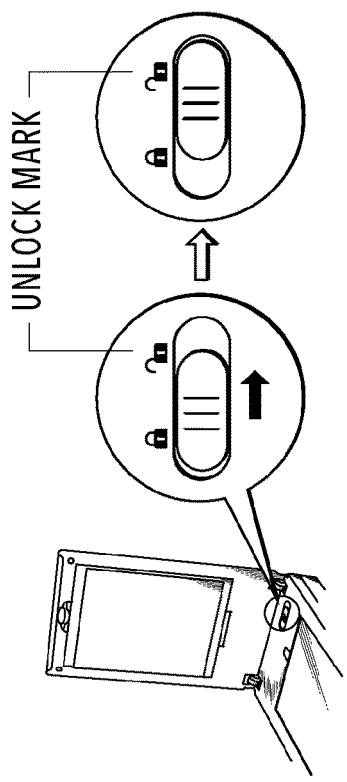
FIG.6B
FIG.6A

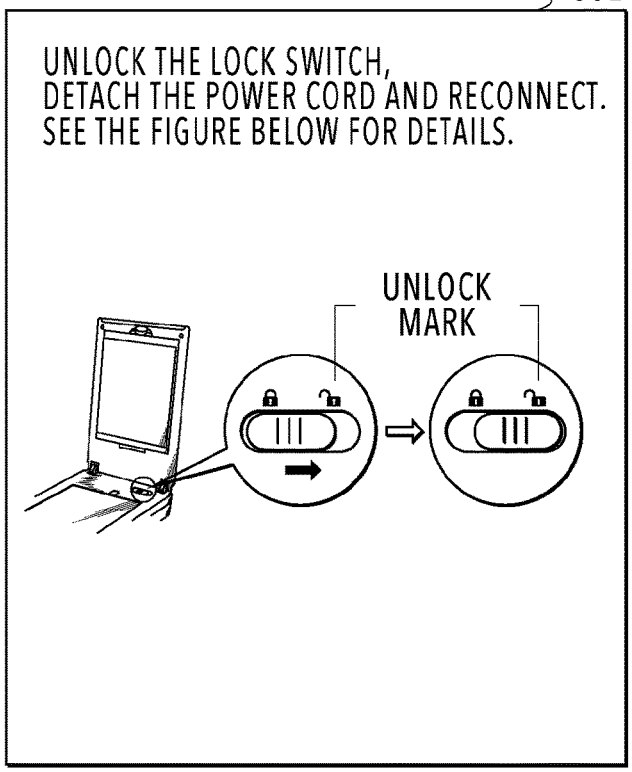
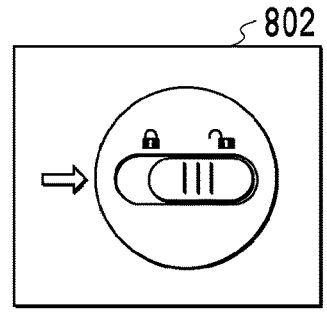
FIG.8A    FIG.8B
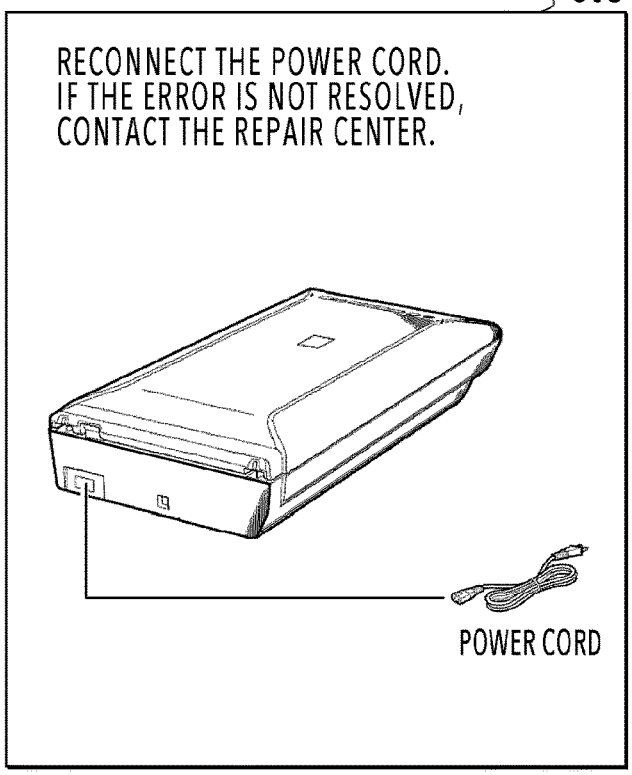
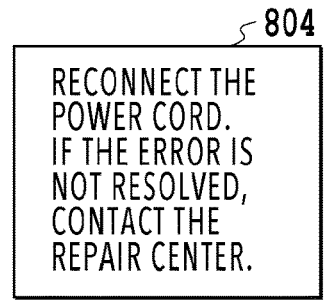
FIG.8C    FIG.8D

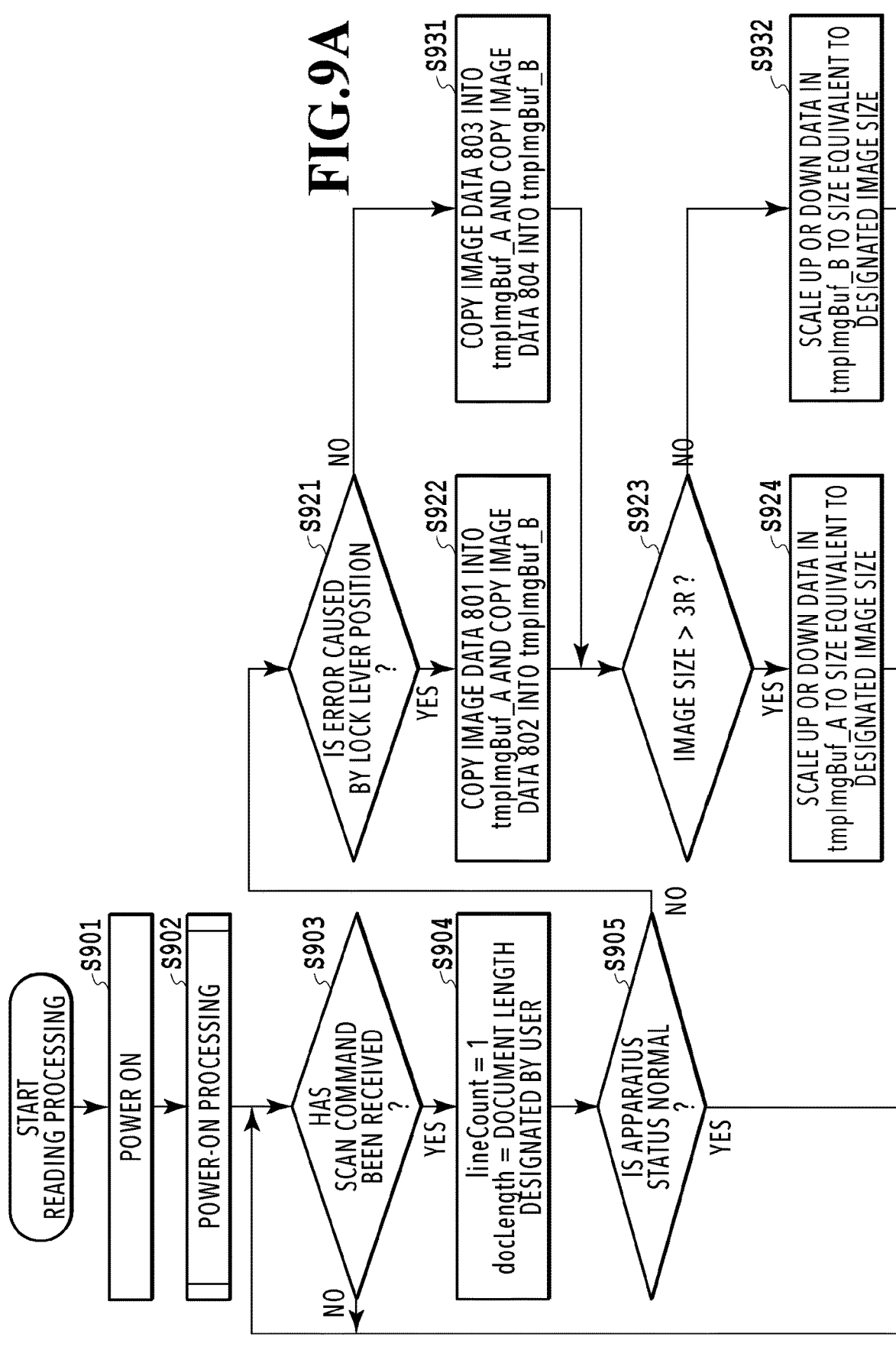

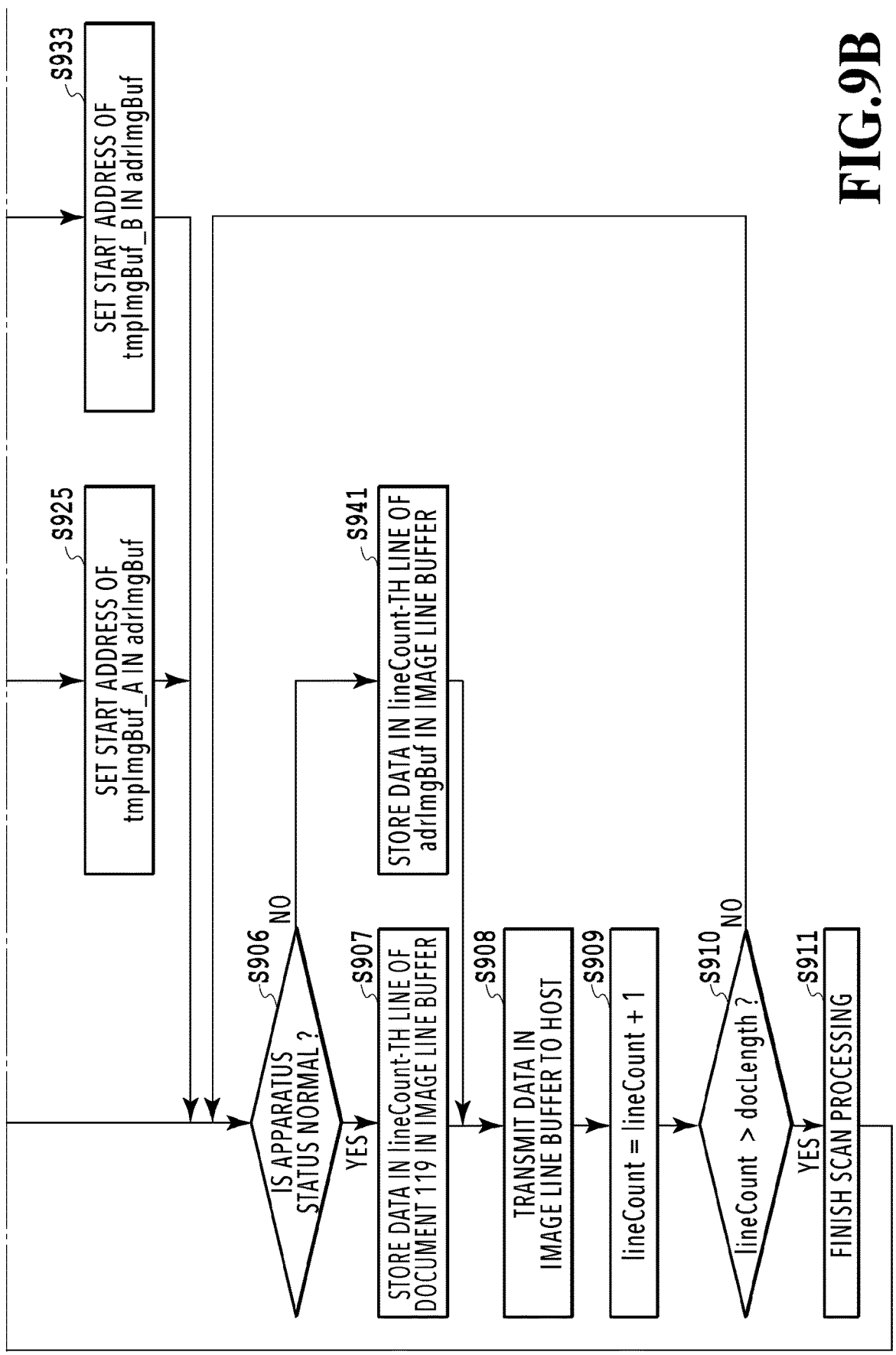

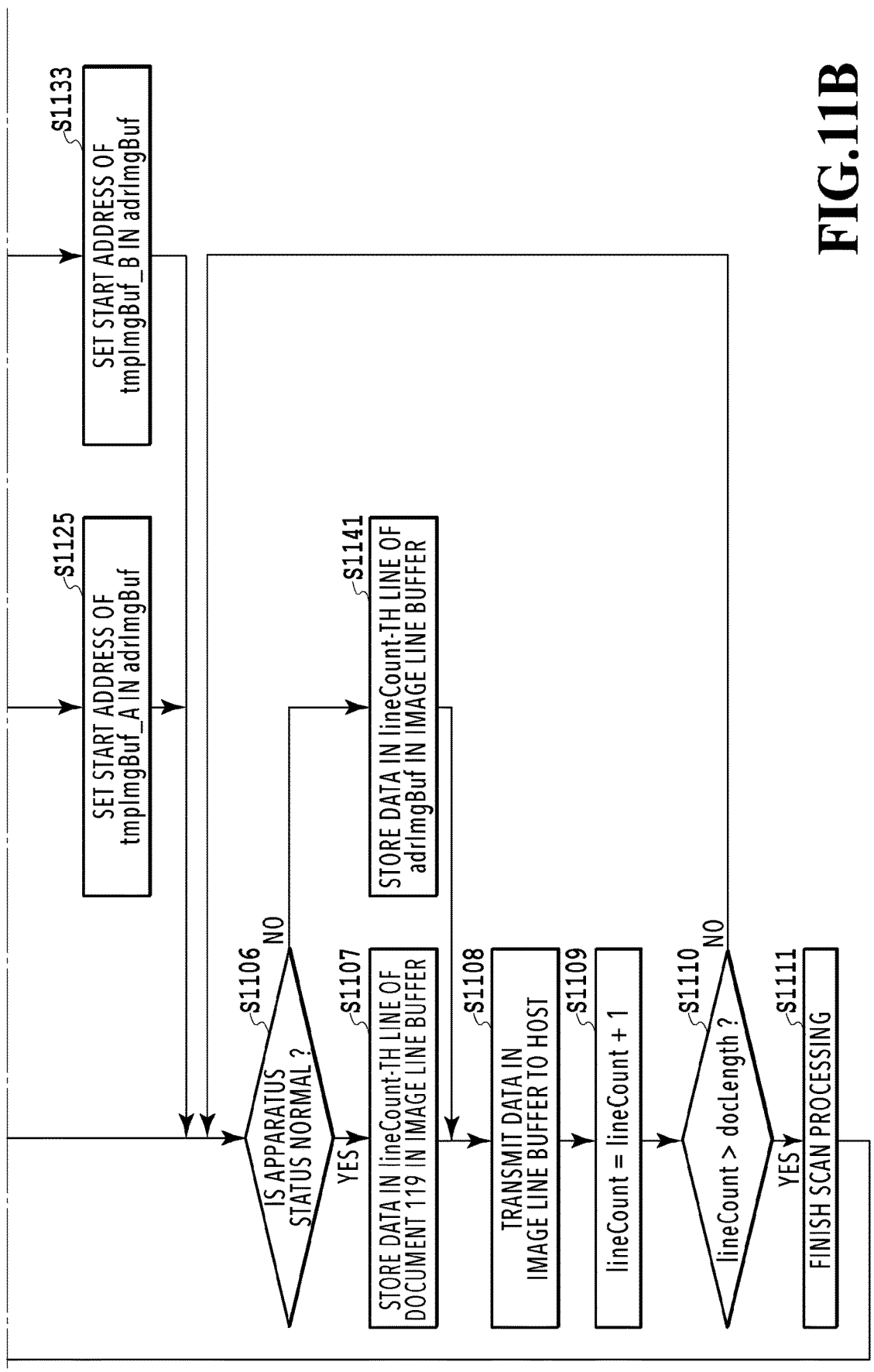

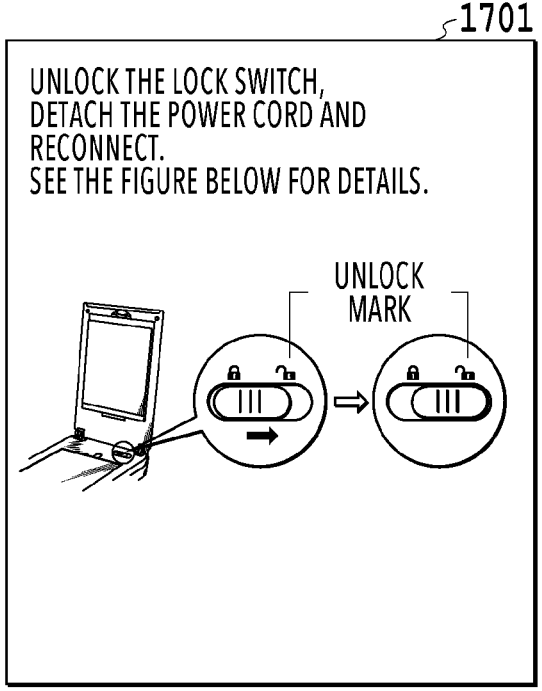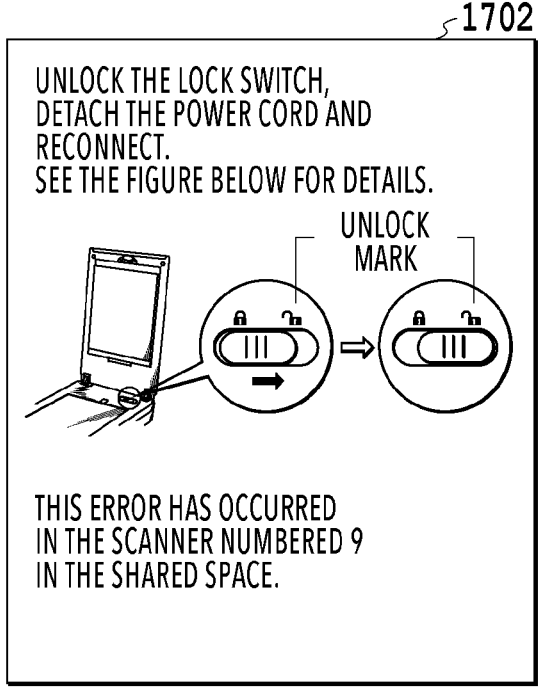
FIG.17A  FIG.17B
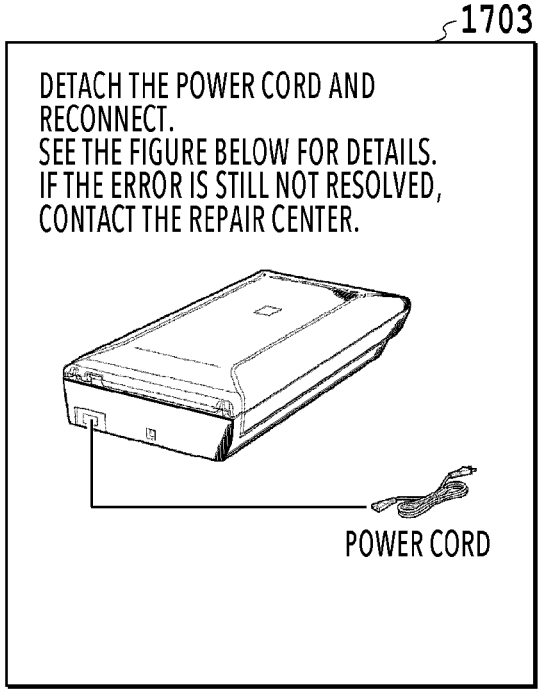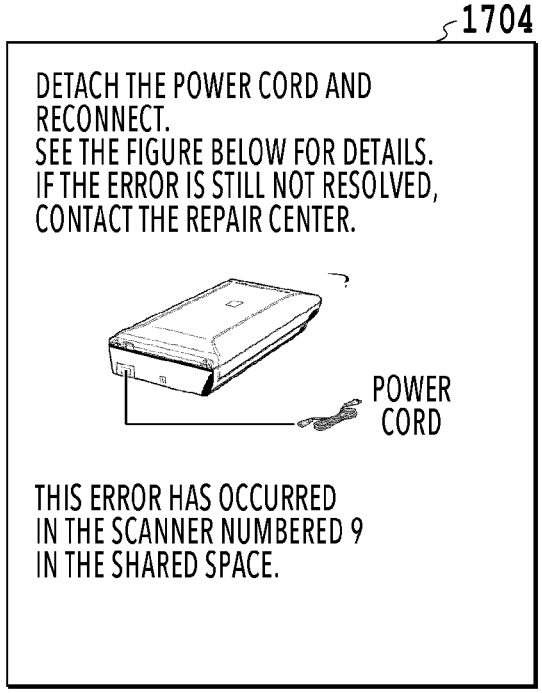
FIG.17C  FIG.17D

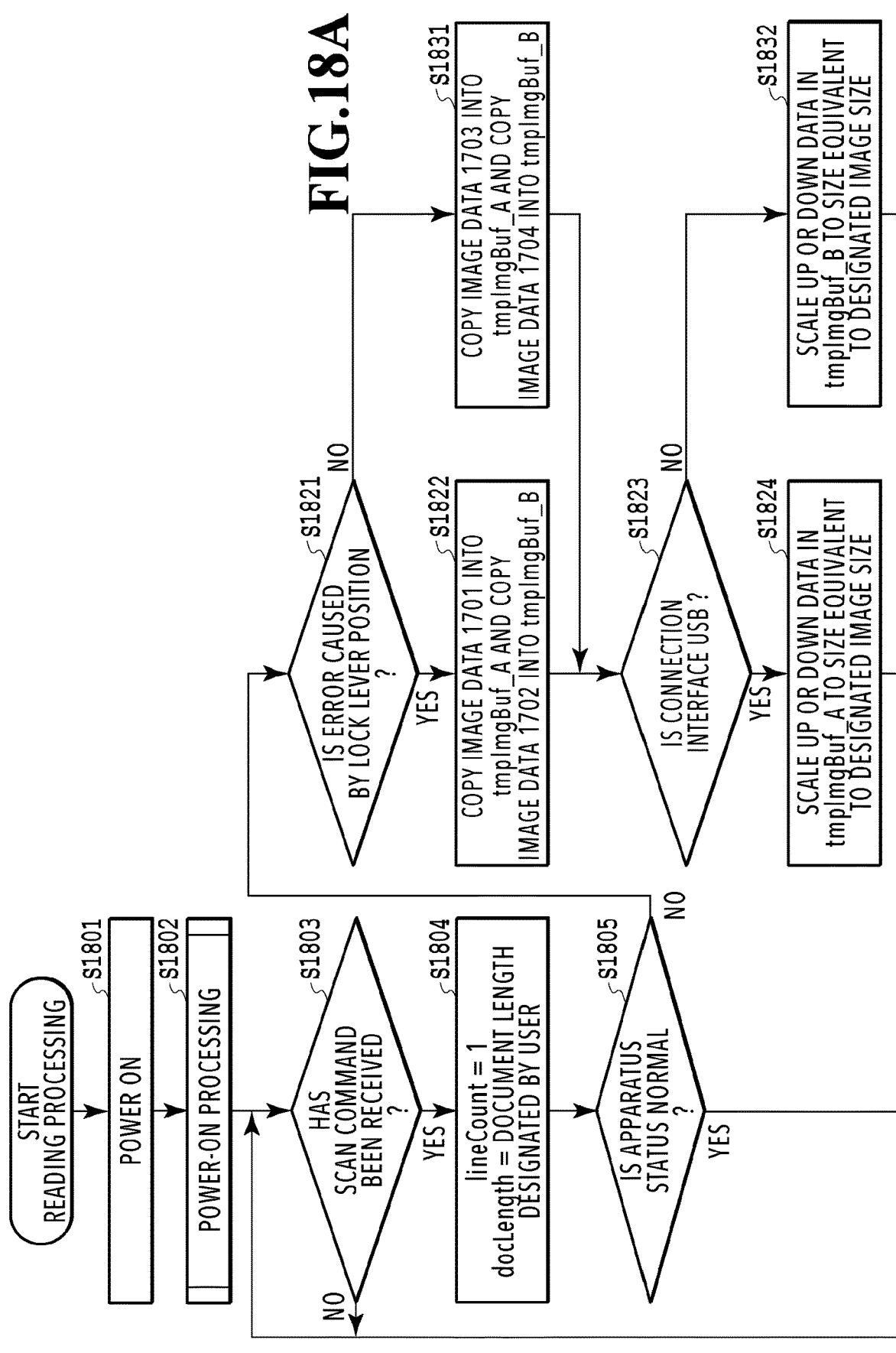

IMAGE READING APPARATUS HAVING ERROR SPECIFICATION AND CONTROL METHOD OF IMAGE READING APPARATUS

BACKGROUND OF THE INVENTION

Field of the Invention

The present invention relates to an image reading apparatus which reads an image and transmits the read image data to a host computer and a control method of the image reading apparatus.

Description of the Related Art

A host computer comprises software for selecting the function of a peripheral apparatus and representing the status of the apparatus. However, the software may be incapable of dealing with all errors that occur in the peripheral apparatus. In this case, there is a possibility that the software cannot suitably notify an error that has occurred in the peripheral apparatus.

To solve the problem, Japanese Patent Laid-Open No. 2008-124648 discloses a method of specifying an error that has occurred in an image reading apparatus by displaying a two-dimensional code or the like by means of a display unit provided in the image reading apparatus.

However, in a case where a user is not near the peripheral apparatus, an error that has occurred in the peripheral apparatus cannot be specified. Thus, there is a need for a technique capable of more easily specifying an error that has occurred in the peripheral apparatus.

SUMMARY OF THE INVENTION

Therefore, an image reading apparatus of the present invention is an image reading apparatus connectable to an information processing apparatus comprising predetermined software, the image reading apparatus comprising: a reading unit configured to perform scan processing for a document in a case where a read command transmitted from the information processing apparatus by user operation to the predetermined software is received; a detection unit configured to detect an error status of the image reading apparatus; and a transmission unit configured to transmit image data corresponding to the detected error status as scan image data, wherein image data corresponding to an error status is displayed as scan image data by the predetermined software.

According to the present invention, a user can easily specify an error that has occurred in the peripheral apparatus.

Further features of the present invention will become apparent from the following description of exemplary embodiments with reference to the attached drawings.

BRIEF DESCRIPTION OF THE DRAWINGS

FIG. 6A is a diagram showing an image of explanatory image data to be transmitted to the host computer;

FIG. 6B is a diagram showing an image of explanatory image data to be transmitted to the host computer;

FIG. 7 is a diagram showing a relationship between FIGS. 7A and 7B;

FIG. 8A is a diagram showing an image of explanatory image data to be transmitted to the host computer;

FIG. 8B is a diagram showing an image of explanatory image data to be transmitted to the host computer;

FIG. 8C is a diagram showing an image of explanatory image data to be transmitted to the host computer;

FIG. 8D is a diagram showing an image of explanatory image data to be transmitted to the host computer;

FIG. 9 is a diagram showing a relationship between FIGS. 9A and 9B;

FIGS. 9A and 9B are flowcharts showing reading processing;

FIG. 11 is a diagram showing a relationship between FIGS. 11A and 11B;

FIGS. 11A and 11B are flowcharts showing reading processing;

FIG. 13 is a diagram showing a relationship between FIGS. 13A and 13B;

Figure 15:
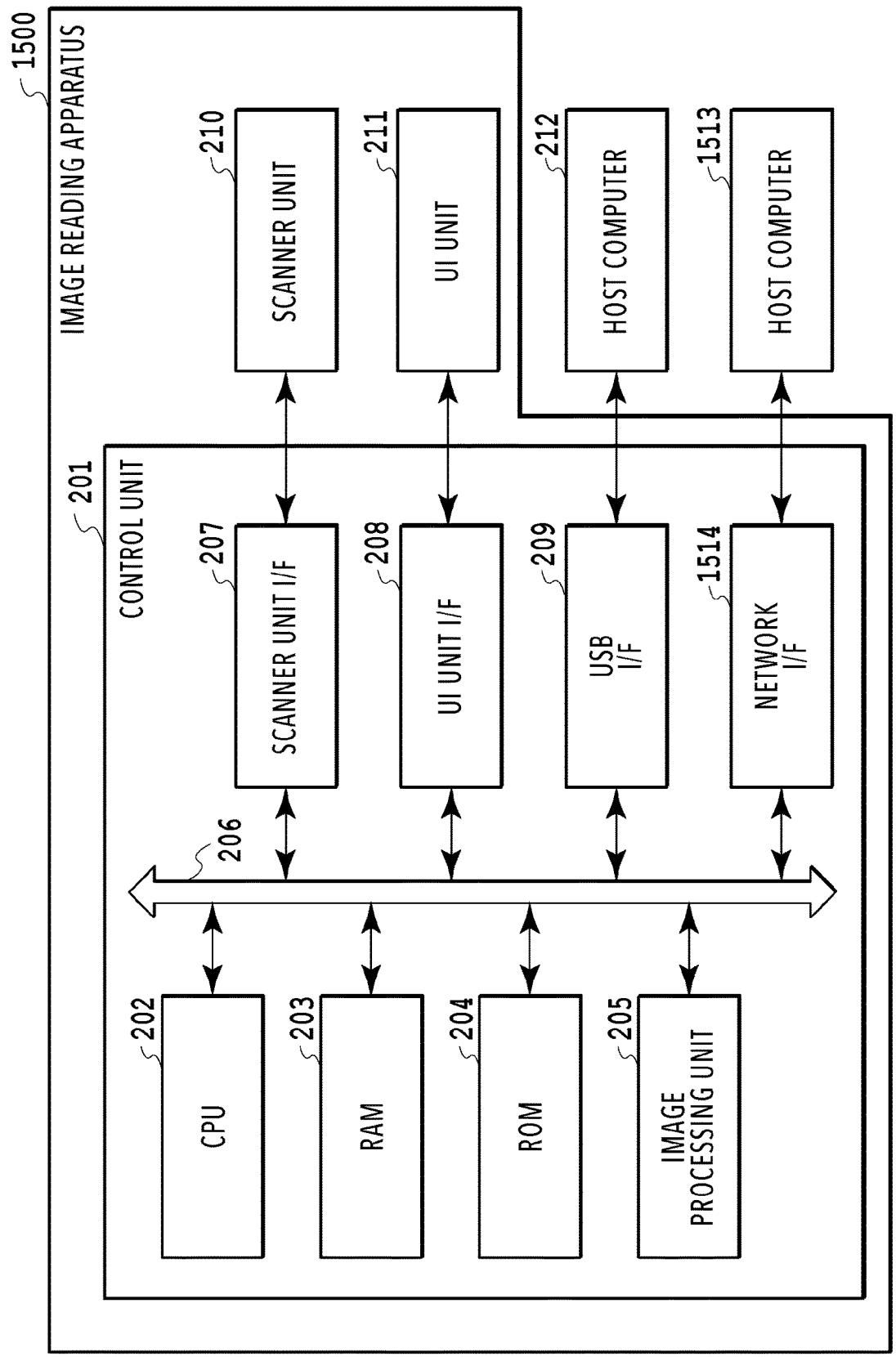
Figure 16:
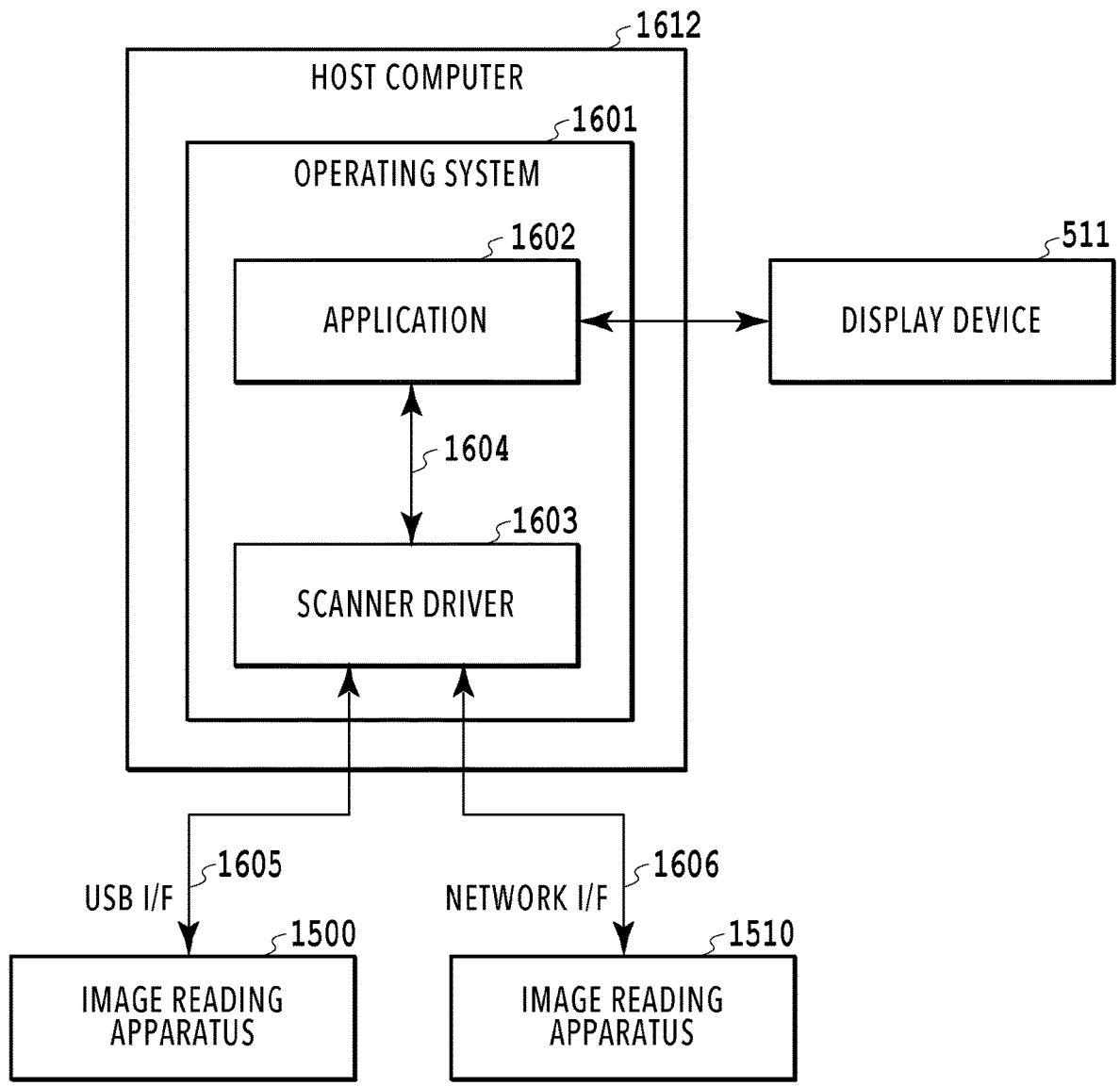
Figure 18B:
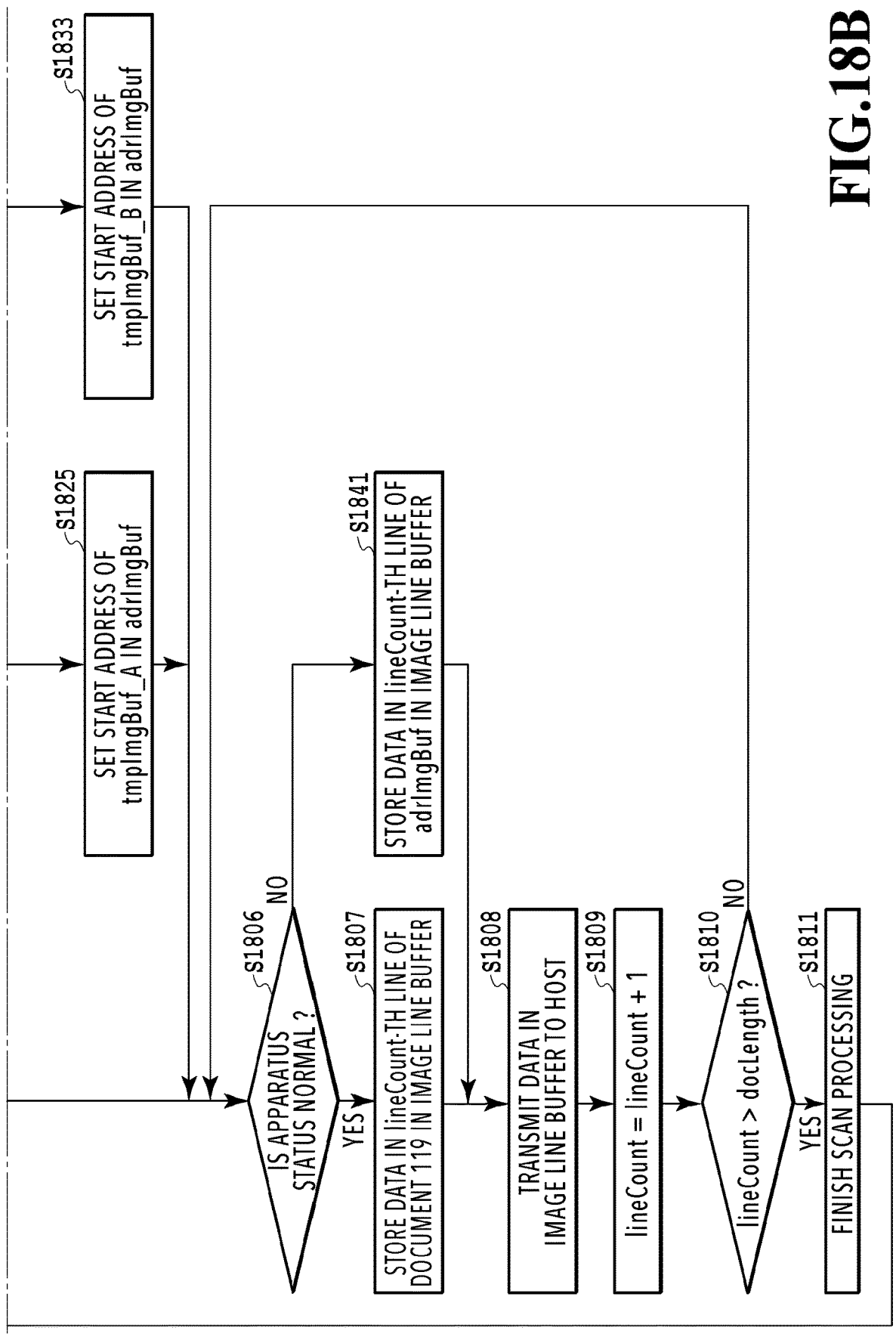
Figure 19A:
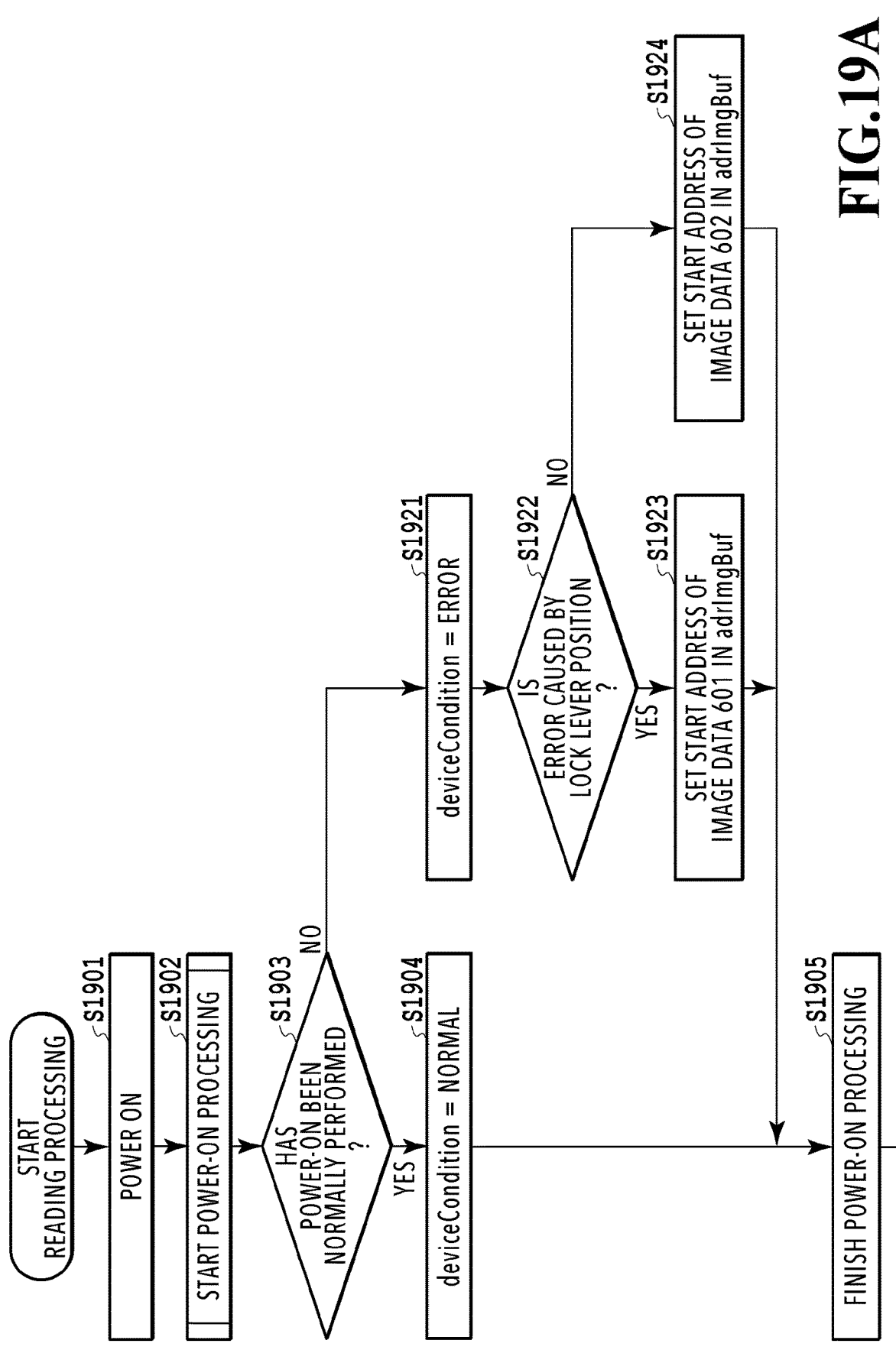
Figure 19B:
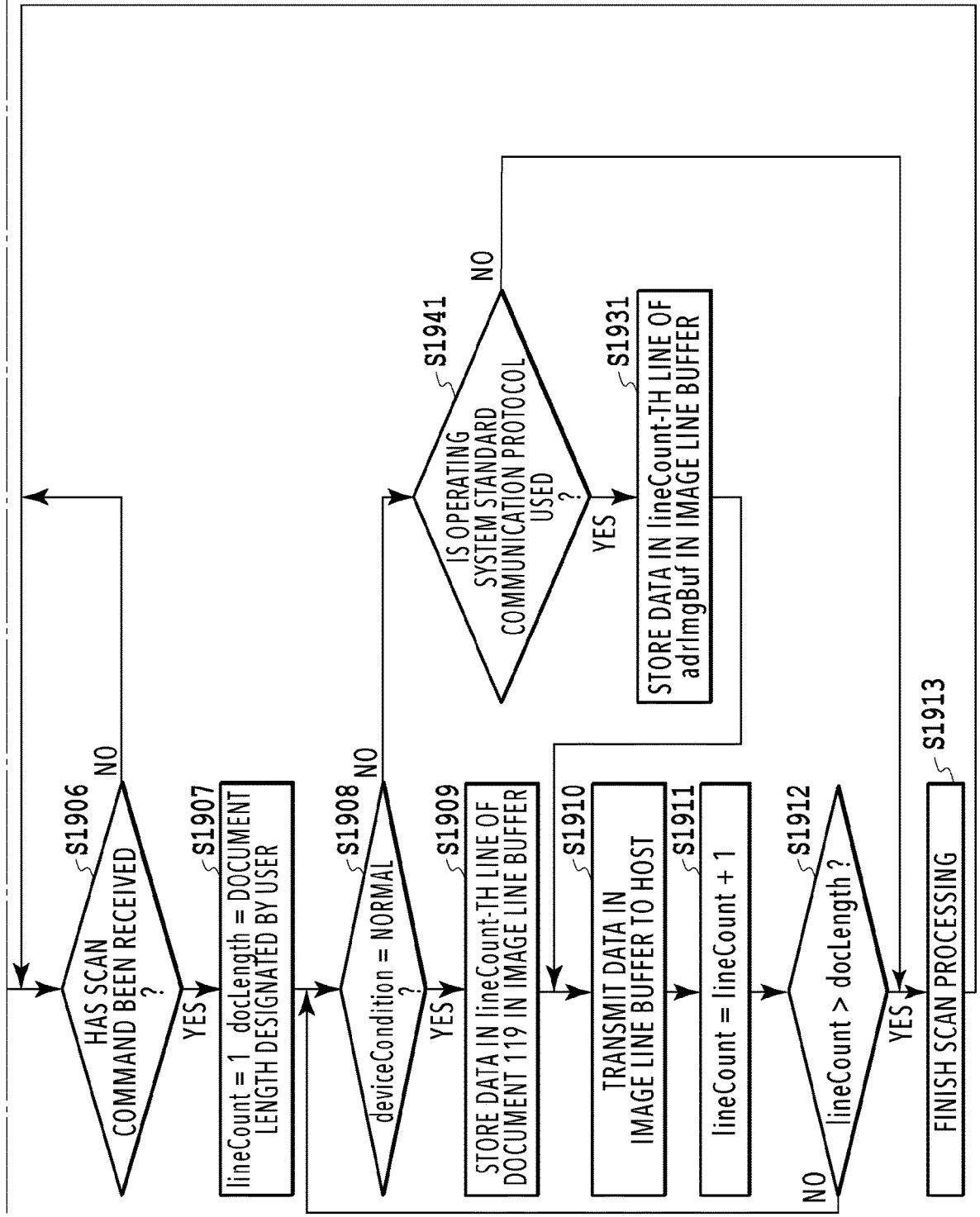

14A and 14B are flowcharts showing reading processing;

FIG. 15 is a block diagram showing a hardware configuration of the image reading apparatus;

FIG. 16 is a configuration diagram showing a system;

FIG. 17A is a diagram showing an image of explanatory image data to be transmitted to the host computer;

FIG. 17B is a diagram showing an image of explanatory image data to be transmitted to the host computer;

FIG. 17C is a diagram showing an image of explanatory image data to be transmitted to the host computer;

FIG. 17D is a diagram showing an image of explanatory image data to be transmitted to the host computer;

FIG. 18 is a diagram showing a relationship between FIGS. 18A and 18B;

18A and 18B are flowcharts showing reading processing;

FIG. 19 is a diagram showing a relationship between FIGS. 19A and 19B; and 19A and 19B are flowcharts showing reading processing.

DESCRIPTION OF THE EMBODIMENTS

First Embodiment

A first embodiment of the present invention will be described with reference to the drawings.

Figure 1A:
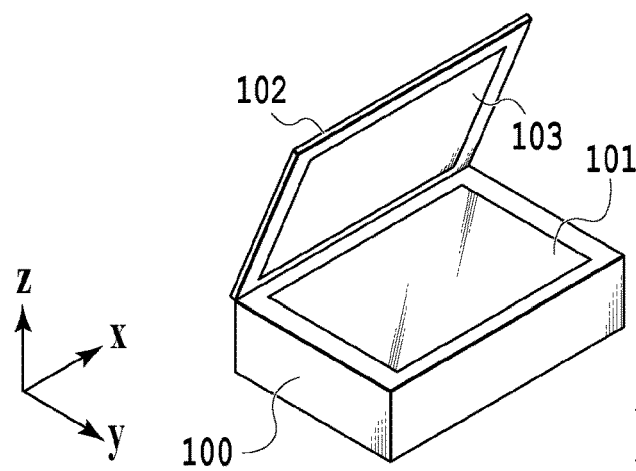
FIG. 1A is a diagram showing an image reading apparatus.
Figure 1B:
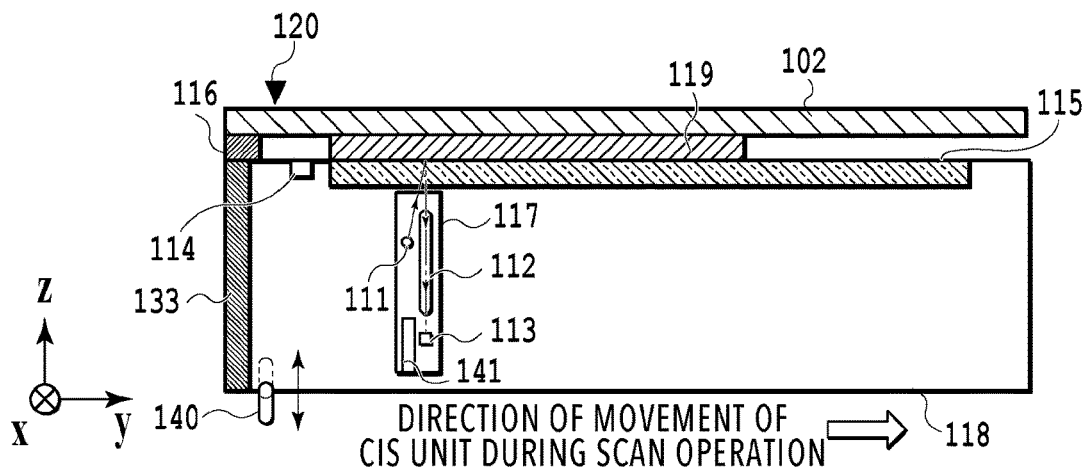
FIG. 1B is a diagram showing the image reading apparatus.
Figure 1C:
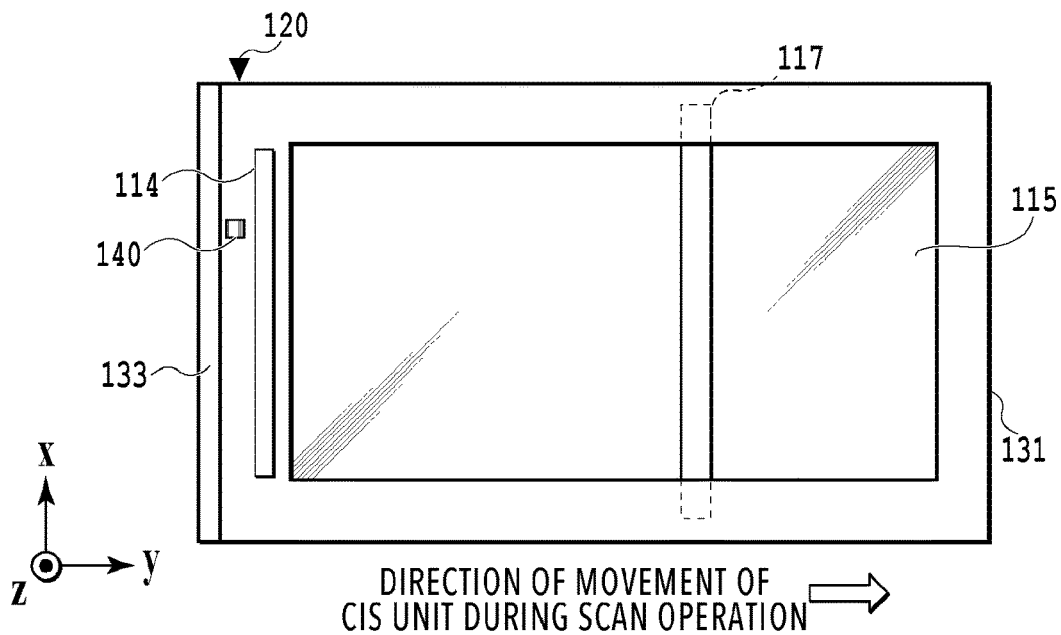
FIG. 1C is a diagram showing the image reading apparatus.

FIG. 1A to FIG. 1C are diagrams showing an image reading apparatus 100 to which the present embodiment is applicable. FIG. 1A is an external perspective view, FIG. 1B is a cross-sectional side view, and FIG. 1C is a cross-sectional top view. The image reading apparatus 100 comprises a document plate 101 on which a document 119 to be read can be placed and a document plate cover 102 provided to be openable and closable by a hinge 116 and having the pressing plate function of pressing the document 119 to fix the document 119 onto the document plate 101 as well as the function of reducing the influence of external light.

The document plate cover 102 is equipped with a white sheet 103 such that a portion other than the document is formed as a white image. The document plate 101 is provided with contact glass 115. In a case where the document 119 is read by the image reading apparatus 100, the document plate cover 102 is closed, the document 119 is sandwiched between the document plate cover 102 and the contact glass 115, and a contact image sensor (hereinafter referred to as CIS) unit 117 reads an image while moving (it is hereinafter assumed that "reading" has the same meaning as "scanning"). A distance between the CIS unit 117 and the document 119 can be kept constant by pressing the document 119 against the contact glass 115 by means of the document plate cover 102.

The CIS unit 117 comprises an LED light guide unit 111 configured to emit light and illuminate the document 119 and an image sensor array 113 configured to generate an electric signal by photoelectric conversion. The light emitted from the LED light guide unit 111 is reflected on the document 119 and guided to the image sensor array 113 by a rod lens array 112. In the image sensor array 113, sensors capable of performing photoelectric conversion of the incident light and outputting it as a current are one-dimensionally arrayed in a main scanning direction in a ±x direction. The image reading apparatus 100 obtains an output from each of the sensors forming the image sensor array 113 in the order of arrangement of the sensors and performs A/D conversion.

The CIS unit 117 comprises a lock socket 141. In a case where the CIS unit 117 is in a home position 120, a user can insert a lock member 140 provided in a frame 118 of the image reading apparatus 100. As a result, the CIS unit 117 is fixed in the home position 120 and movement is restricted. The home position 120 is a reference position of the CIS unit 117 in which the CIS unit 117 is stopped and kept on standby during operation standby. A reference position mark 114 and a reference side wall 133 of the frame are used as a reference by which the image reading apparatus 100 recognizes the position of the document 119 placed on the document plate 101 in a y direction. Since FIG. 1C shows a state in which the image reading apparatus 100 is reading the document 119, the CIS unit 117 is in a position other than the home position 120.

Figure 2:
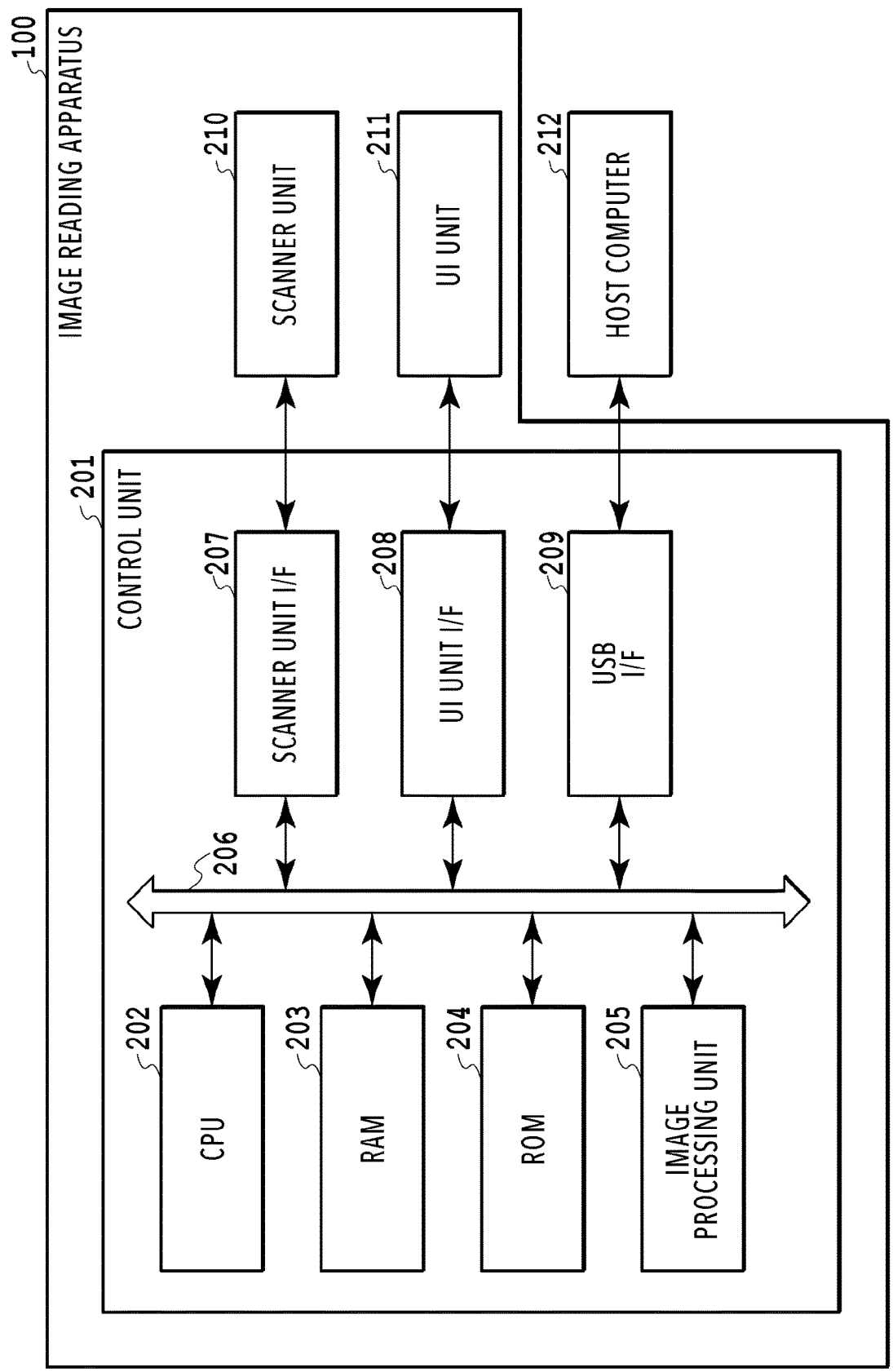
FIG. 2 is a block diagram showing a hardware configuration of the image reading apparatus.

FIG. 2 is a block diagram showing a hardware configuration of the image reading apparatus 100. A control unit 201 including a CPU 202 comprises a bus 206 and controls the operation of the entire image reading apparatus 100 by exchanging information between respective units via the bus 206. The CPU 202 expands a control program stored in a ROM 204 on a RAM 203 and reads the program as necessary to perform various types of control. The RAM 203 is a main memory of the CPU 202 and is used as a temporal storage area for expanding various programs stored in a work area or the ROM 204. The ROM 204 stores image data, various programs and various types of setting information.

Although a flash storage is assumed as the ROM 204 for example in the present embodiment, the ROM 204 may be an auxiliary storage such as a hard disk. For example, explanatory image data shown in FIG. 6 and the like, which will be described later, is stored in the ROM 204 before receipt of a scan instruction from a user. In the image reading apparatus 100, one CPU 202 uses one memory (RAM 203) to execute each process shown in the flowcharts to be described later. However, the image reading apparatus 100 may have another aspect. For example, a plurality of CPUs, RAMs, ROMs, and storages may cooperate with each other to execute each process shown in the flowcharts to be described later. Further, some processes may be executed using a hardware circuit.

A scanner unit I/F 207 connects a scanner unit 210 to the control unit 201. The scanner unit 210 scans the document 119 set in the image reading apparatus 100 to generate digital image data and transfers the data to the RAM 203 of the control unit 201 via the scanner unit I/F 207. An operation unit I/F 208 connects a UI unit 211 to the control unit 201. In an expensive configuration, the UI unit 211 comprises a liquid crystal display unit having the function of a touch panel and an operation key and functions as a reception unit configured to receive a user instruction. In an inexpensive configuration, the UI unit 211 often comprises only an operation key for push scanning. The image reading apparatus 100 having the latter configuration will be described.

A USB I/F 209 controls communication with a host computer 212 that is an information processing apparatus connected to the image reading apparatus 100. For example, in a case where a scan operation command is requested by the host computer 212 via a USB cable, the USB I/F 209 receives the requested signal and stores the signal in the RAM 203. The CPU 202 causes the scanner unit 210 to perform scan operation via the scanner unit I/F 207 and temporarily stores the obtained digital image data in the RAM 203. The digital image data stored in the RAM 203 is transferred to the host computer 212 via the USB I/F 209.

The CPU 202 deletes the digital image data stored in the RAM 203 after confirming that the digital image data is transferred to the host computer 212. The scan operation requested by the host computer 212 is finished by finishing transferring and deleting all items of digital image data.

The control unit 201 comprises an image processing unit 205. The image processing unit 205 is used in a case where the digital image data obtained by the scan operation requires image processing or correction. The image processing unit 205 is mainly used in a case where image processing or correction requiring time by the control program expanded on the RAM 203 is executed by the hard function.

Figure 3:
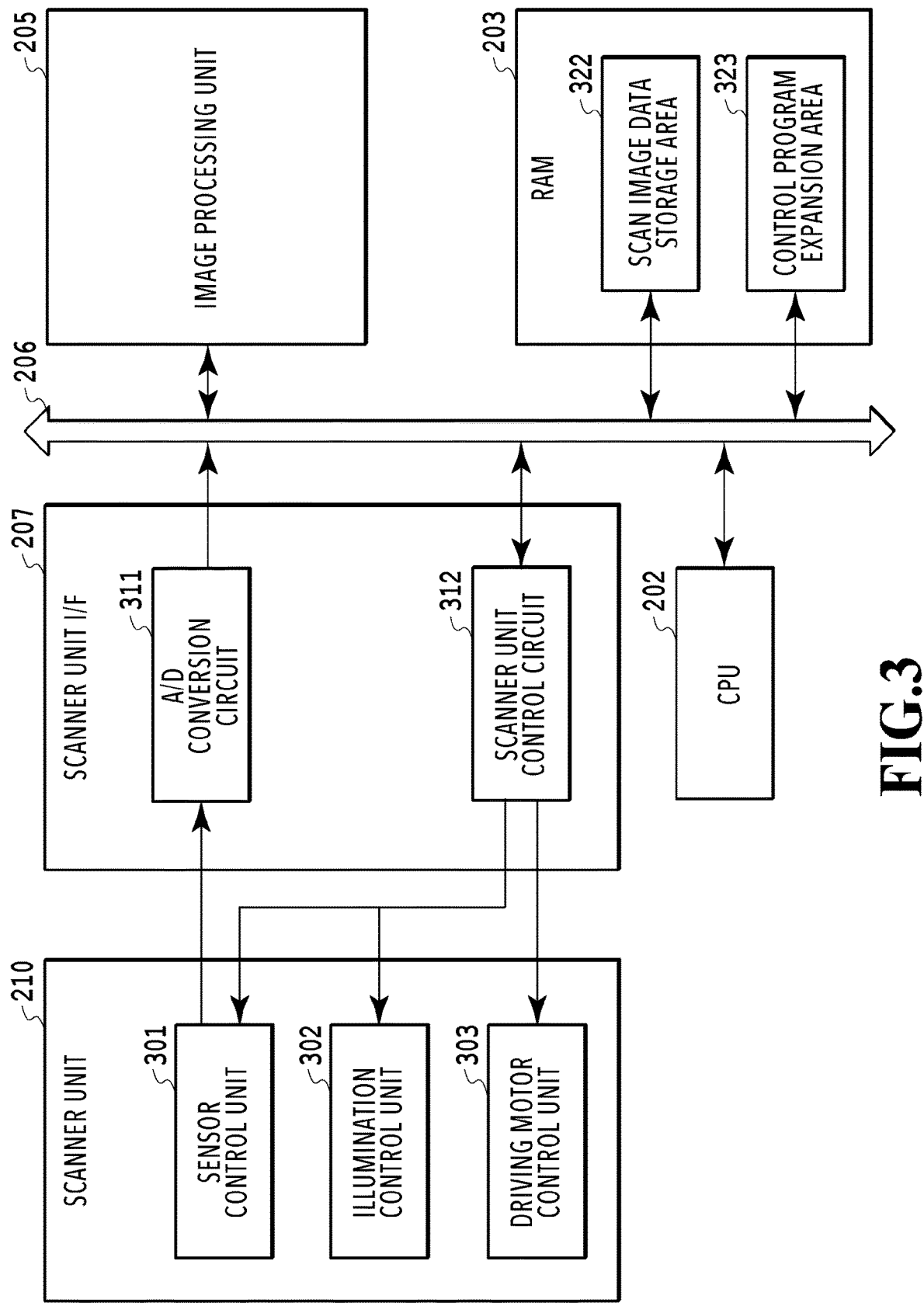
FIG. 3 is a block diagram showing part of the image reading apparatus.

FIG. 3 is a block diagram showing part of the entire image reading apparatus 100 used in the case of performing scan operation to form digital image data. The scanner unit 210 comprises a sensor control unit 301, an LED 302, and a driving motor control unit 303. The sensor control unit 301 is an operation control unit of the image sensor array 113. The LED 302 is an illumination control unit of the LED light guide unit 111 (see FIG. 1B). The scanner I/F unit 207 comprises a scanner control circuit 312 which controls the driving motor control unit 303 to drive a motor by means of a scanner control module to be described later. An A/D conversion circuit 311 converts analog data obtained from the sensor control unit 301 into digital data. The RAM 203 is provided with a scan image data storage area 322 and a control program expansion area 323.

Figure 4:
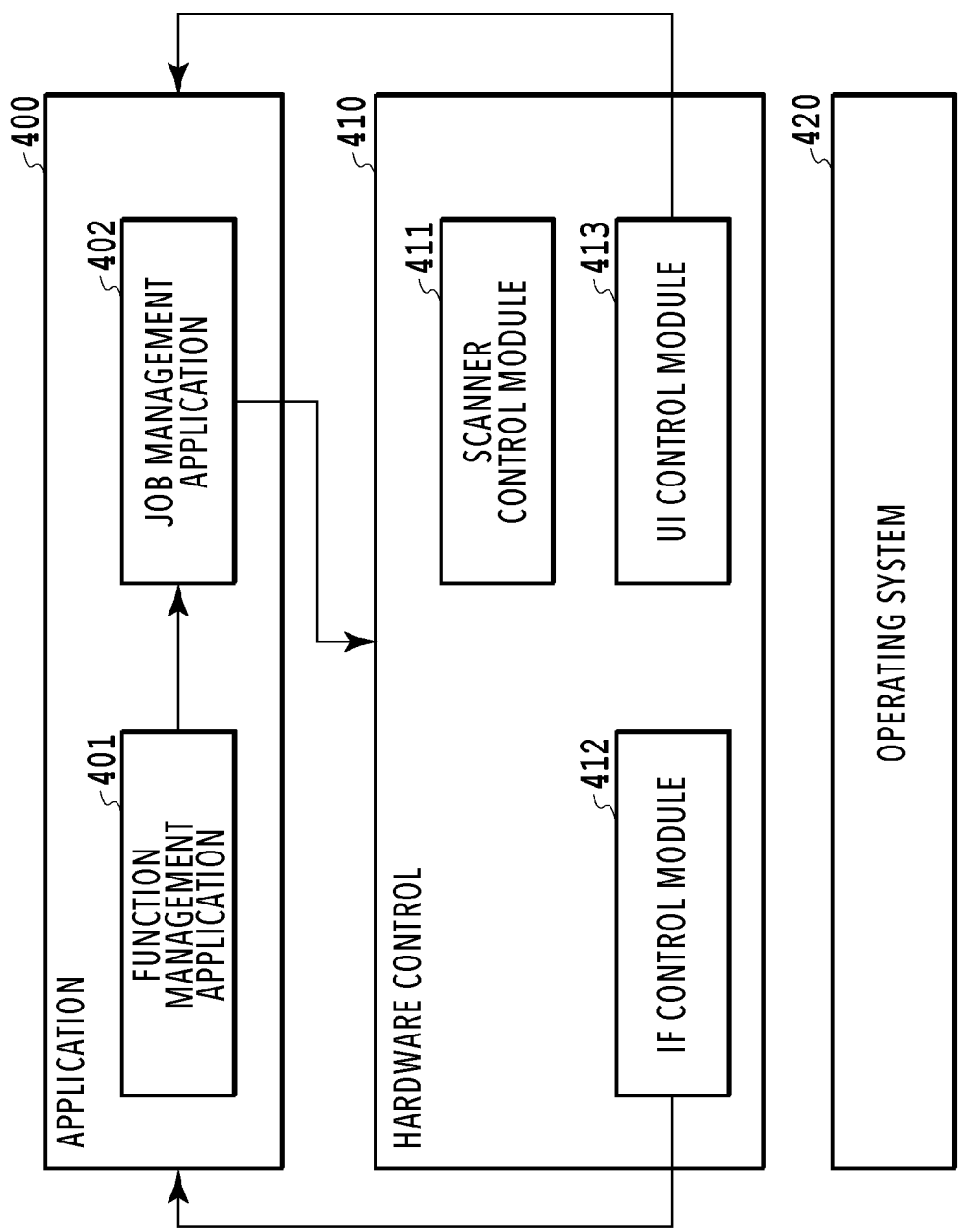
FIG. 4 is a software configuration diagram of a control program for controlling hard modules.

FIG. 4 is a software configuration diagram of the control program for controlling each hard module expanded on the RAM 203 of the image reading apparatus 100. The control program comprises an application 400, hardware control 410, and an operating system 420 of the image reading apparatus 100. The operating system 420 provides a basic function of executing the control program in the control unit 201 (see FIG. 2). The hardware control 410 comprises a software group for controlling I/F with a physical device. In the present embodiment, the hardware control 410 comprises a scanner control module 411 for controlling the scanner unit I/F 207, an IF control module 412 for controlling the USB I/F 209, a UI control module 413 for controlling the operation unit I/F 208, and the like.

The application 400 operates each device via the hardware control 410. For example, the application 400 analyzes information input to the IF control module 412, and in a case where the information is a scan operation command, executes a function management application 401 for executing a scan. The function management application 401 executes a scan job in a job management application 402. The job management application 402 uses the scanner control module 411 of the hardware control 410 to execute scan operation by the scanner unit 210 and stores the resultant digital image data in the RAM 203. At the time of storing the data in the RAM 203, in a case where image processing or correction of some kind is necessary, the scanner control module 411 executes necessary processing by using the image processing unit 205. After being accumulated in the RAM 203, the digital image data is returned to the host computer 212 via the IF control module 412.

An output from each sensor of the image sensor array 113 is stored in the RAM 203. Whether the output from each sensor in the single image sensor array 113 is used as read data depends on a resolution designated by the job management application 402. In a case where a scan operation target range is designated, the scanner control module 411 first designates a scan operation range in the main scanning direction of the image sensor array 113. This determines a range of sensors in the image sensor array 113 that produce outputs to be used.

The scanner control module 411 also designates a scan operation range in a drive direction of the CIS unit 117. This determines how long the CIS unit 117 moves for reading in the drive direction. In a case where the scanner unit 210 receives a scan command from the scanner control module 411 via the scanner unit I/F 207, the scanner unit 210 causes the LED light guide unit 111 to illuminate and reads the document 119 set in the contact glass 115 while moving the CIS unit 117. The sensor portion of the CIS unit 117 of the present embodiment is the single image sensor array 113.

The scanner control module 411 switches the incident light to R (Red), G (Green), and B (Blue), obtains outputs corresponding to the respective colors, and combines the obtained outputs, thereby obtaining color digital image data. At this time, the illumination color is switched to R, G, and B during an image scan and the reflected light from the document 119 is guided to the image sensor array 113 via the rod lens array 112. The reflected light from the document 119 is made incident on the image sensor array 113, whereby outputs corresponding to the respective colors are obtained. The scanner control module 411 stores the obtained outputs in the RAM 203.

The scanner control module 411 generates digital image data from the outputs obtained using the image processing unit 205. After the scan of the document 119 set in the contact glass 115 is completed and the generation of the digital image data on the document 119 is finished, the scanner control module 411 moves the CIS unit 117 to a standby position in preparation for a scan of the next document.

Figure 5:
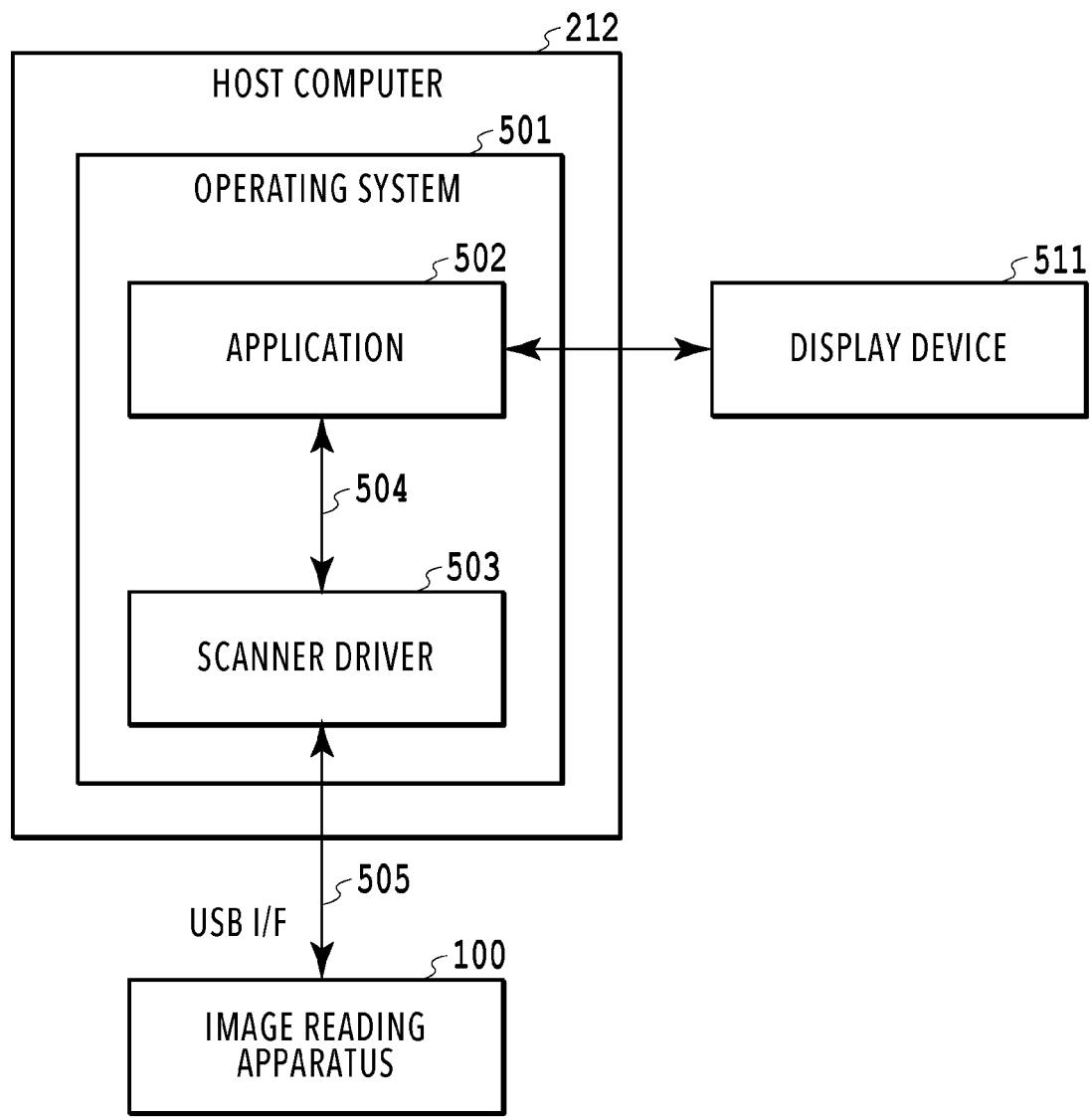
FIG. 5 is a configuration diagram of a system in which a host computer is connected to the image reading apparatus.

FIG. 5 is a configuration diagram showing a system in which the host computer 212 is connected to the image reading apparatus 100. The host computer 212 comprises an operating system 501. The operating system 501 comprises an application 502 and a scanner driver 503. The image reading apparatus 100 is connected to the scanner driver 503 of the operating system 501 via a USB I/F 505. A display device 511 of the host computer 212 is connected to the application 502 of the operating system 501.

The application 502 is software that runs on the operating system 501. The application 502 transmits a command such as a scan operation command to the scanner driver 503 according to a predetermined application programming interface (API) specification 504 and receives digital image data and status information on the image reading apparatus 100 in response. The application 502 also performs processing of displaying the read digital image data and status information using the display device 511, storing the read digital image data in the host computer 212 as a file, and the like.

The scanner driver 503 is software that runs on the operating system 501. Upon receipt of a command from the application 502, the scanner driver 503 communicates with the image reading apparatus 100 via the USB I/F 209 according to a predetermined communication protocol 505, thereby transmitting a command such as a scan operation command to the image reading apparatus 100 and receiving digital image data and status information from the image reading apparatus 100.

Recently-used operating system standard driver software does not support function selection, status representation and the like concerning an individual hardware configuration in a peripheral apparatus. Accordingly, there is a case where the image reading apparatus 100 cannot receive information corresponding to an individual hardware configuration according to the API specification 504 and the communication protocol 505.

For example, since the lock member 140 of the image reading apparatus 100 is not compliant with the operating system standard driver software, the operating system standard driver software is incapable of function selection or status representation concerning the lock member 140. In a case where a user starts using the image reading apparatus 100 without realizing that the lock member 140 is inserted into the lock socket 141, the CIS unit 117 does not move and an error occurs. At this time, in a case where the user watches the display screen of the host computer 212, there is a possibility that the user cannot recognize the cause of the error.

Thus, in the event of an abnormality such as an error, the image reading apparatus 100 of the present embodiment transmits explanatory image data, which is an image explaining the occurred abnormality using an illustration and text, to the host computer 212, instead of document image data. Since the explanatory image data can be treated in the same manner as document image data, the explanatory image data can be transmitted to the image reading apparatus 100 via the USB I/F 209 according to the predetermined communication protocol 505 and displayed on the host computer 212.

Therefore, the user can be informed that the error has occurred in the image reading apparatus 100 by watching the explanatory image received and displayed by the host computer 212. The description will be provided below on the assumption that a scan is instructed by using the operating system standard driver software.

FIG. 6A and FIG. 6B are diagrams showing images of explanatory image data to be transmitted to the host computer 212 in a case where an error occurs in power-on processing. FIG. 6A shows explanatory image data 601 for explaining an error that occurs in a case where the lock member 140 is inserted and the CIS unit 117 is fixed. FIG. 6B shows explanatory image data 602 for explaining an error that occurs in a case where an abnormality occurs in an electric circuit. In the present embodiment, the explanatory image data transmitted to the host computer 212 is displayed on the display device of the host computer 212 as a scan image.

Figure 7A:
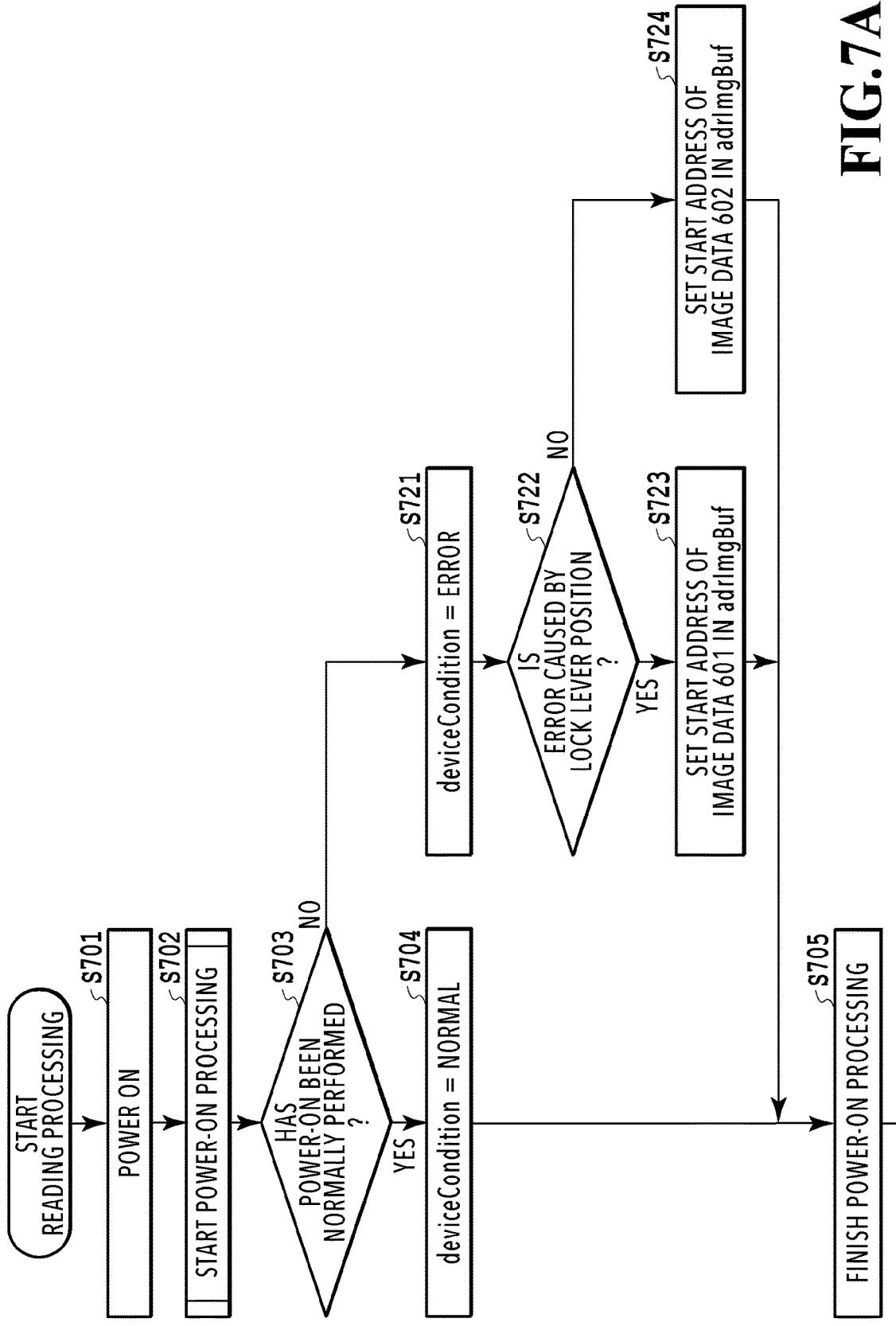
FIGS. 7A and 7B are flowcharts showing reading processing.
Figure 7B:
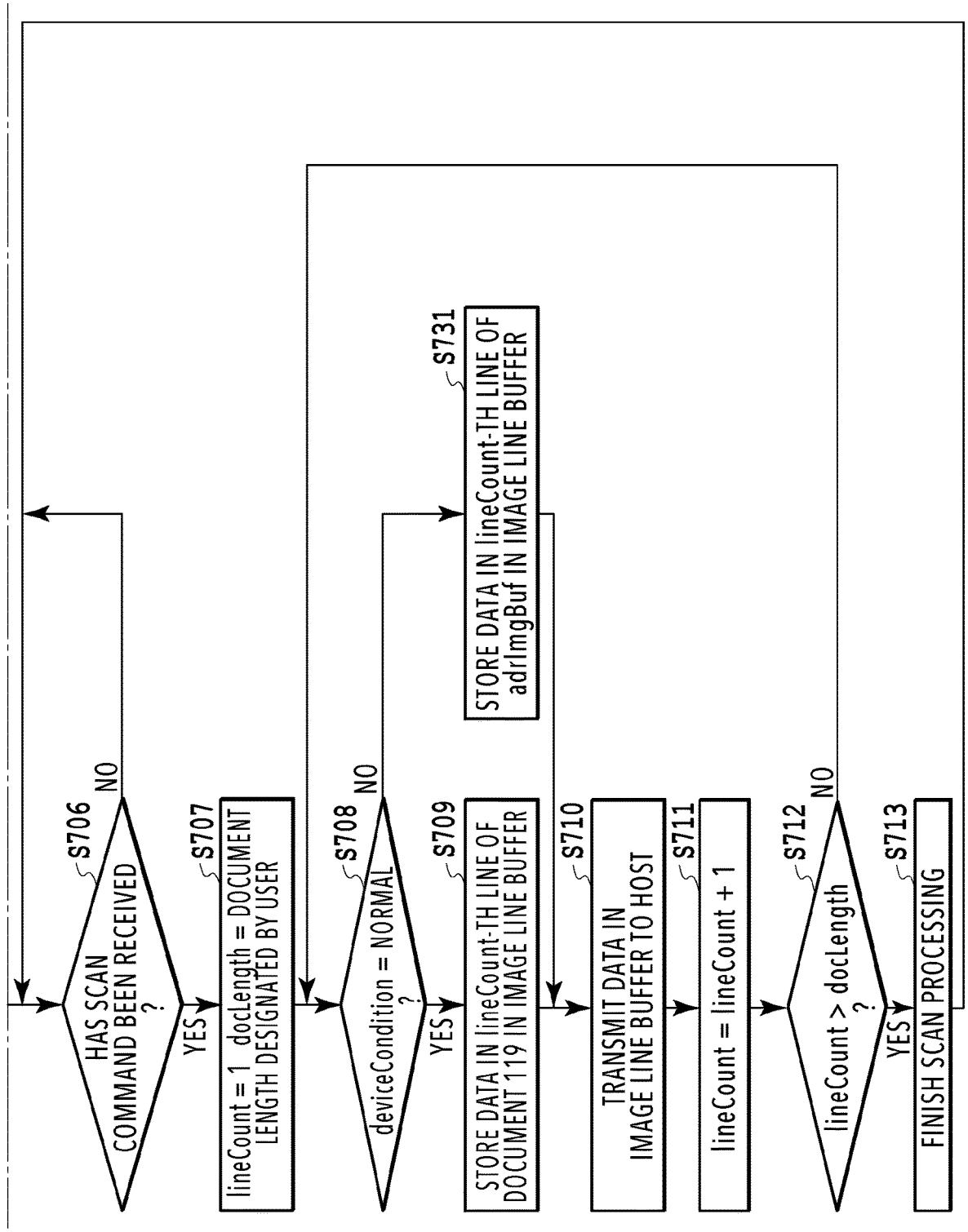

FIGS. 7A and 7B are flowcharts showing reading processing, which is a characteristic configuration of the present embodiment. The reading processing of the present embodiment will be described below with reference to the flowchart.

In a case where the reading processing is started and the image reading apparatus 100 is powered on in S701, power-on processing is performed in S702. After that, the CPU 202 determines whether the power-on has been normally performed in S703, and proceeds to S704 in a case where the power-on has been normally performed. In S704, the CPU 202 substitutes NORMAL, which indicates that the power-on has been normally performed, in deviceCondition, which is a variable indicating the status of the image reading apparatus 100, and proceeds to S705. In a case where the power-on has not been normally performed, the processing of FIG. 7A proceeds to S721, where the CPU 202 substitutes ERROR, which indicates that an error has occurred, in the variable deviceCondition. In S722, the CPU 202 determines whether an error caused by the inserted lock member 140 and the fixed CIS unit 117 in the power-on processing (hereinafter referred to as a lock lever position error) has occurred.

In a case where a lock lever position error has occurred, the CPU 202 stores, in a variable adrImgBuf, the start address of the explanatory image data 601 (see FIG. 6A) for the lock lever position error stored in the ROM 204 (S723), and proceeds to S705. In a case where no lock lever position error has occurred, the CPU 202 determines that the error is caused by an abnormality in the electric circuit. Thus, the CPU 202 proceeds to S724 and stores, in the variable adrImgBuf, the start address of the explanatory image data 602 (see FIG. 6B) for the electric circuit abnormality error in the ROM 204, and proceeds to S705.

After the power-on processing is finished in S705, the CPU 202 determines in S706 whether a command to perform a scan has been received. The determination is repeated until a command to perform a scan is received. Upon receipt of the command, the CPU 202 proceeds to S707. In S707, the CPU 202 substitutes an initial value 1 in lineCount, which counts up each time line output data in the main scanning direction is output from the image sensor array 113. The CPU 202 then obtains information on a length in a sub-scanning direction designated by a user and sets the information in a variable docLength.

After that, in S708, the CPU 202 determines whether deviceCondition is NORMAL. In a case where deviceCondition is NORMAL, the CPU 202 stores the line output data counted by lineCount in an image line buffer in the RAM 203 (S709) and proceeds to S710. In a case where deviceCondition is not NORMAL in S708, the CPU 202 proceeds to S731 and stores the line output data counted by lineCount in the image line buffer in the RAM 203 and proceeds to S710.

In S710, the CPU 202 transmits the data in the image line buffer to the host computer 212 via the USB I/F 209. The CPU 202 then increments lineCount in S711. Following that, in S712, the CPU 202 compares lineCount with docLength and determines whether line data corresponding to the length in the sub-scanning direction designated by the user has been transmitted to the host computer 212. In a case where the data has not been transmitted, the CPU 202 returns to S708 and repeats the processing until line data corresponding to the length in the sub-scanning direction is transmitted. On the other hand, in the case of Yes in S712, the CPU 202 finishes the scan (S713). The step S713 means that the processing of the first scan job is finished. Thus, the CPU 202 returns to the determination step in S706 to confirm whether there is the next scan job. The image data transmitted in S710 is displayed on the display device 511 via the scanner driver 503 and the application 502. That is, in the case of No in S708, explanatory image data shown in FIG. 8 is transmitted to the host computer 212 and displayed on the display device 511.

As described above, in a case where an abnormality in the image reading apparatus 100 is detected, explanatory image data is transmitted to the host computer instead of document image data. The explanatory image data is thus displayed on the display device 511 of the host computer 212. As a result, even in a system dependent on the operating system standard driver incapable of treating information concerning an individual hardware configuration of the peripheral apparatus, a user can be informed of an abnormality in the image reading apparatus. In addition, even an image reading apparatus without a display unit can inform a user of the status of the apparatus, which makes it possible to provide an inexpensive image reading apparatus. In the case of an image reading apparatus with a display unit, the status of the image reading apparatus can be represented by a higher performance display device 511 connected to the host computer 212, which can improve user convenience.

Further, in a case where the application 502 running on the host computer 212 receives the explanatory image data, the data is displayed as an image as in the case of receiving a scan image. This can realize the function of informing a user of the status of the image reading apparatus without extending the function of the application 502, which results in a reduction in design cost. Moreover, convenience can be enhanced since a user can confirm the status of the image reading apparatus without paying attention to a dedicated status management screen or an application display transition.

Although the lock lever position error and the electric circuit abnormality error are described as an example in the present embodiment, the present invention is not limited to this and is applicable to any apparatus status by preparing corresponding explanatory image data. For example, in a case where a failure occurs in the document plate cover 102, explanatory image data corresponding to the failure in the document plate cover 102 may be transmitted to the host computer. Further, although the configuration of the ordinary image reading apparatus in which the document is placed on the document plate is described as an example in the present embodiment, any other configurations are possible as long as they are image reading apparatus. For example, the advantageous result can also be produced by an image reading apparatus with an automatic document feeder (ADF) or a noncontact image reading apparatus.

Second Embodiment

A second embodiment of the present invention will be described with reference to the drawings. Since a basic configuration of the present embodiment is the same as that of the first embodiment, only a characteristic configuration will be described below.

In the first embodiment, the explanatory image data received from the image reading apparatus 100 is displayed on the display device 511 of the host computer 212 without any change. In contrast, in the present embodiment, the explanatory image data is displayed after being changed or scaled up (or scaled down), that is, subjected to image adjustment, depending on the size of a read image set by a read command. That is, in a case where the set read image size is a large size (size larger than 3R in the present embodiment), the image reading apparatus 100 displays a detailed explanatory image using text and an illustration on the display device 511. On the other hand, in a case where the read image size is a small size (size equal to or smaller than 3R in the present embodiment), the image reading apparatus 100 displays an explanatory image using only an illustration readable even in a small size on the display device 511. This can lighten a reduction in user convenience in the case of displaying image data corresponding to the set read image size on the display device 511. The method will be described below.

FIG. 8A to FIG. 8D are diagrams showing images of explanatory image data to be transmitted to the host computer 212. FIG. 8A shows explanatory image data 801 transmitted in a case where a lock lever position error occurs. FIG. 8B shows explanatory image data 802 transmitted in a case where a lock lever position error similarly occurs and a user designates a read image size smaller than 3R. FIG. 8C shows explanatory image data 803 transmitted in a case where an abnormality occurs in the electric circuit. FIG. 8D shows explanatory image data 804 transmitted in a case where an abnormality occurs in the electric circuit as in FIG. 8C and a user designates a read image size smaller than 3R.

FIGS. 9A and 9B are flowcharts showing reading processing, which is a characteristic configuration of the present embodiment. The reading processing of the present embodiment will be described below with reference to the flowchart.

In a case where the reading processing is started and the image reading apparatus 100 is powered on in S901, power-on processing is performed in S902. In the first embodiment, the CPU 202 determines whether the power-on processing has been normally performed after the power-on processing. In contrast, in the present embodiment, considering that an abnormality can occur in any operation in the apparatus, the CPU 202 performs processing not limited to an abnormality in the power-on processing.

After that, S903 and S904 are performed, which are the same as S706 and S707 in FIG. 7B and are thus not described in detail. Following that, in S905, the CPU 202 determines whether the apparatus is normal or abnormal. In a case where the apparatus is normal, the CPU 202 proceeds to S906. In a case where the apparatus is abnormal, the CPU 202 proceeds to S921 and determines whether the cause of the abnormality is a lock lever position error.

In a case where a lock lever position error occurs, the CPU 202 proceeds to S922 and copies the detailed explanatory image data 801 for the lock lever position error stored in the ROM 204 into a memory tmpImgBuf_A reserved for image data. The CPU 202 also copies the simplified explanatory image data 802 into a memory tmpImgBuf_B reserved for image data, and proceeds to S823. In a case where no lock lever position error occurs, the CPU 202 proceeds to S931 and copies the detailed explanatory image data 803 for the electric circuit abnormality error into the memory tmpImgBuf_A reserved for image data. The CPU 202 also copies the simplified explanatory image data 804 into the memory tmpImgBuf_B reserved for image data, and proceeds to S923.

In S923, the CPU 202 obtains image size information designated by a user. In a case where the obtained image size information indicates a size larger than 3R, the CPU 202 proceeds to S924. In S924, the CPU 202 scales up (or scales down) the data in the memory tmpImgBuf_A, into which the detailed explanatory image data has been copied, to a size equivalent to the image size designated by the user. The CPU 202 then stores the start address of tmpImgBuf_A in the variable adrImgBuf in S925 and proceeds to S906. In S923, in a case where the obtained image size information indicates a size equal to or smaller than 3R, the CPU 202 proceeds to S932. In S932, the CPU 202 scales up (or scales down) the data in the memory tmpImgBuf_B, into which the simplified explanatory image data has been copied, to a size equivalent to the image size designated by the user. The CPU 202 then stores the start address of tmpImgBuf_B in the variable adrImgBuf in S933 and proceeds to S906.

In S906, the CPU 202 determines whether the image reading apparatus 100 is normal or abnormal. The CPU 202 proceeds to S907 in a case where the apparatus is normal and proceeds to S941 in a case where the apparatus is abnormal. Although whether the image reading apparatus 100 is normal or abnormal is also determined in S905 and the determination is thus repetitive, the determination step is provided anew as a step in the case of returning from the branch in S910 to be described later. The determination result in S906 is the same as that in S905. In the case of proceeding from S906 to S907, the CPU 202 stores one line output data in the main scanning direction in the lineCount-th line of the document 119 in the image line buffer in the RAM 203 and then proceeds to S908. In a case where the apparatus is abnormal, the CPU 202 proceeds to S941, stores line output data counted by lineCount in the image data stored from the address of the variable adrImgBuf in the image line buffer in the RAM 203, and proceeds to S908.

The processing from S908 to S911 is the same as the processing from S710 to S713 in FIG. 7B and is therefore not described in detail.

As described above, in the configuration of transmitting explanatory image data to the host computer instead of document image data in a case where an abnormality in the image reading apparatus 100 is detected, the explanatory image data is changed or scaled up (or scaled down) according to the condition of the image size set by the user. As a result, even in a system dependent on the operating system standard driver incapable of treating information concerning an individual hardware configuration of the apparatus, a user can be informed of the status of the image reading apparatus.

Third Embodiment

A third embodiment of the present invention will be described with reference to the drawings. Since a basic configuration of the present embodiment is the same as that of the first embodiment, only a characteristic configuration will be described below.

The image reading apparatus often uses a two-dimensional code to provide a user with error resolution information. Although the two-dimensional code is a useful unit applicable to, for example, guidance to an online manual in which more detailed error resolution information is accumulated, there is a case where the two-dimensional code image is deteriorated (reduced in resolution) by JPEG compression and the two-dimensional code becomes unreadable. Thus, in the present embodiment, a mode concerning the resolution of a read image can be set. In a case where a mode setting in a read command designates a RAW scan, the two-dimensional code is combined with the explanatory image data. In a case where the mode setting designates a JPEG scan, the two-dimensional code is not combined with the explanatory image data. The method will be described below.

Figure 10A:
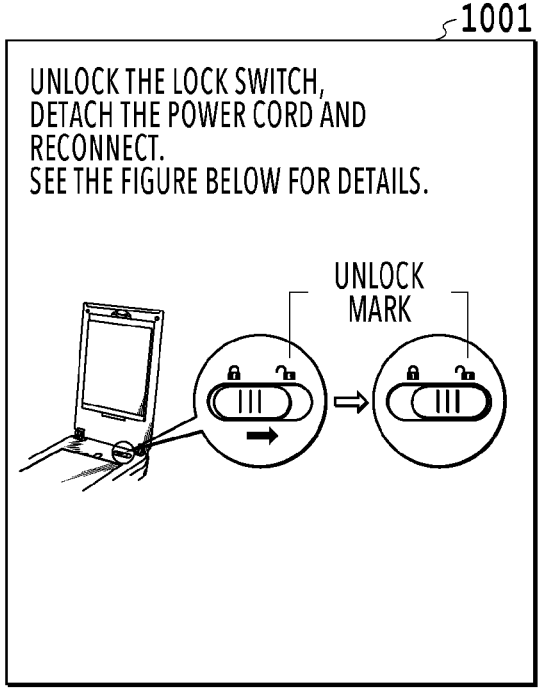
FIG. 10A is a diagram showing an image of explanatory image data to be transmitted to the host computer.
Figure 10B:
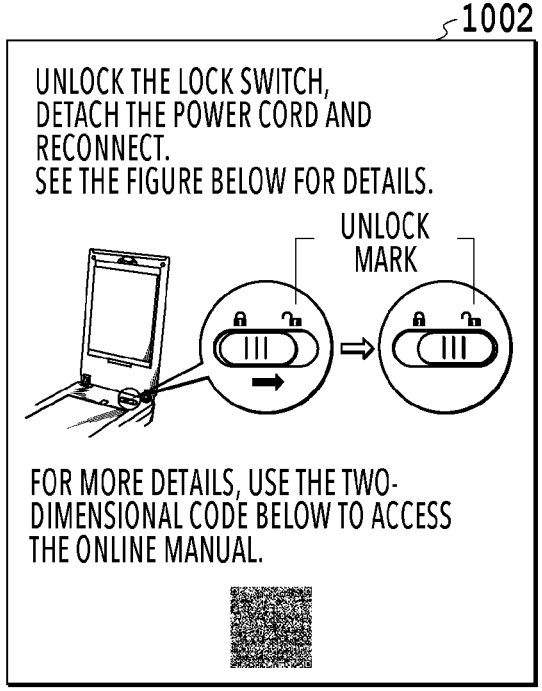
FIG. 10B is a diagram showing an image of explanatory image data to be transmitted to the host computer.
Figure 10C:
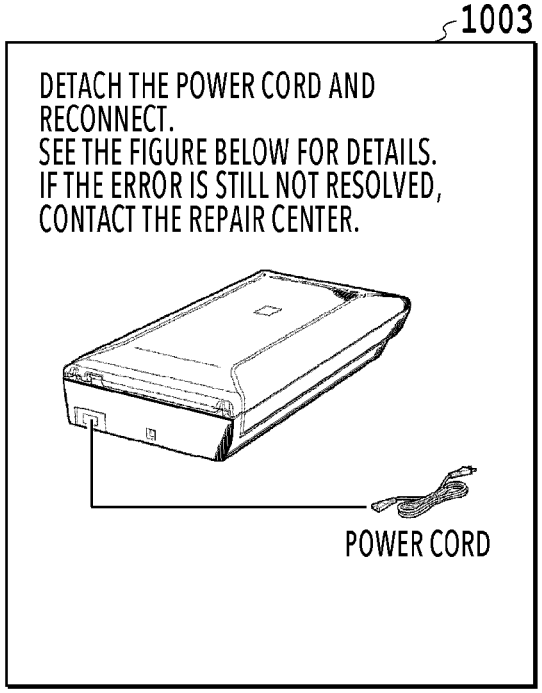
FIG. 10C is a diagram showing an image of explanatory image data to be transmitted to the host computer.
Figure 10D:
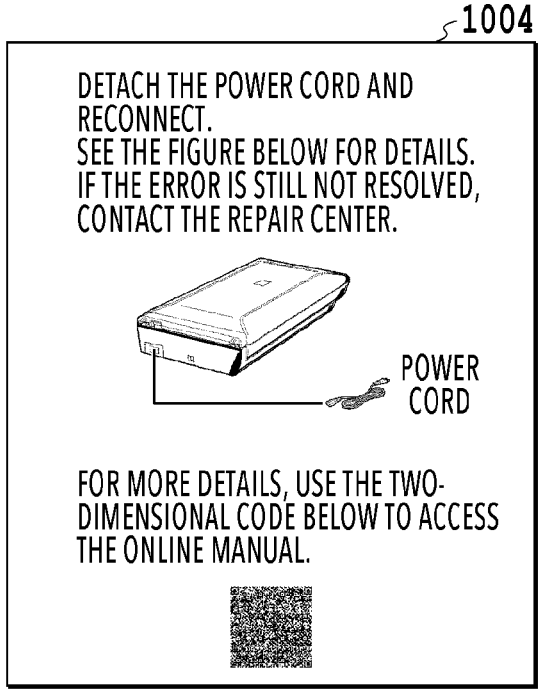
FIG. 10D is a diagram showing an image of explanatory image data to be transmitted to the host computer.

FIG. 10A to FIG. 10D are diagrams showing images of explanatory image data to be transmitted to the host computer 212. FIG. 10A shows explanatory image data 1001 transmitted in a case where a lock lever position error occurs. FIG. 10B shows explanatory image data 1002 transmitted in a case where a lock lever position error occurs and a RAW scan is designated. FIG. 10C shows explanatory image data 1003 transmitted in a case where an abnormality occurs in the electric circuit. FIG. 10D shows explanatory image data 1004 transmitted in a case where an abnormality occurs in the electric circuit and a RAW scan is designated.

Figure 11A:
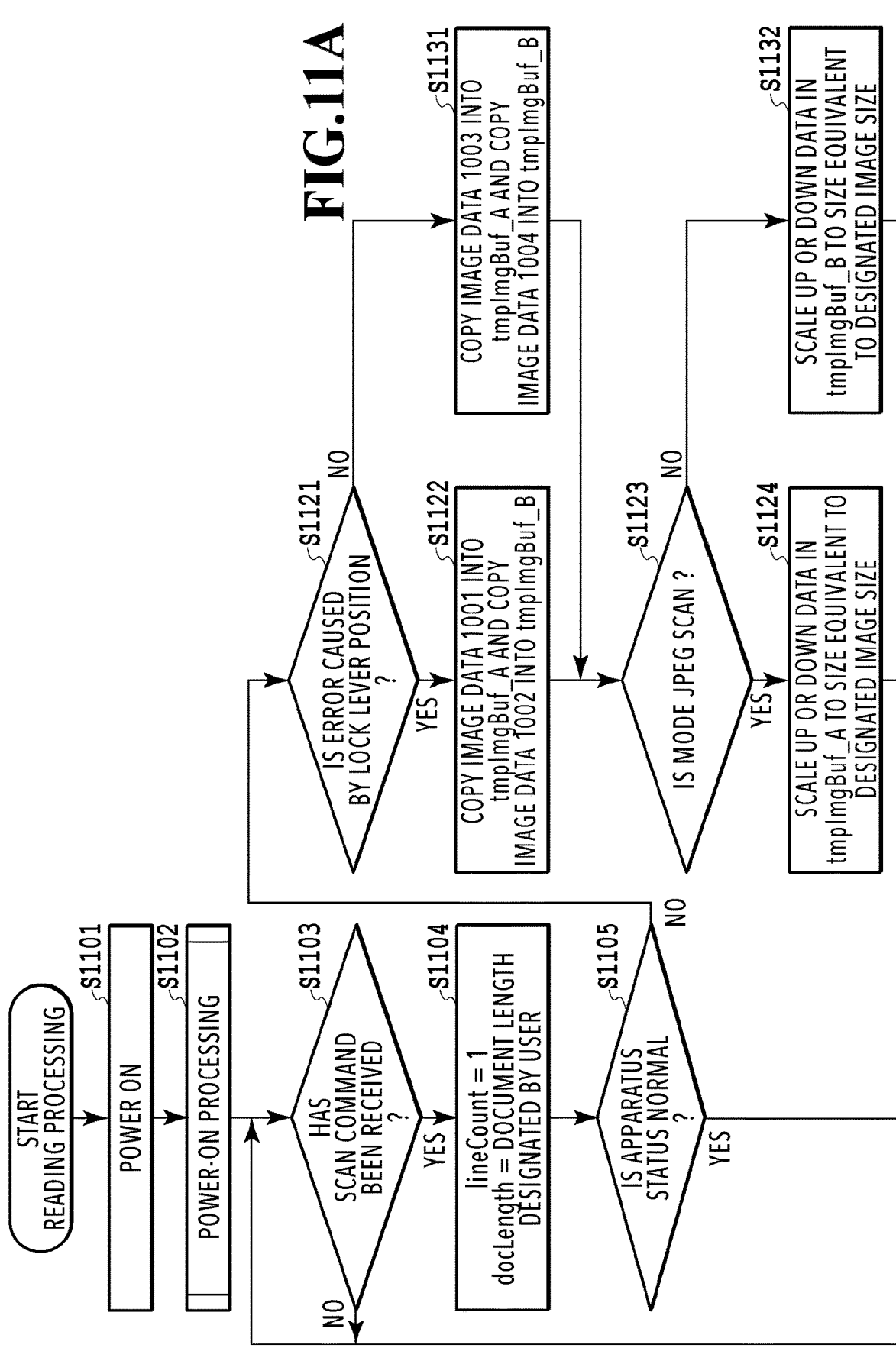

FIGS. 11A and 11B are flowcharts showing reading processing, which is a characteristic configuration of the present embodiment. The reading processing of the present embodiment will be described below with reference to the flowchart. The reading processing of the present embodiment is substantially identical to the reading processing of the second embodiment described with reference to FIG. 9A, except for the processing from S921 to S923 (corresponding to the processing from S1121 to S1123 in FIG. 11A). The processing different from the second embodiment will be described below and the description of the same processing will be omitted.

In a case where a lock lever position error occurs in S1121, the CPU 202 proceeds to S1122. The CPU 202 copies the detailed explanatory image data 1001 for the lock lever position error stored in the ROM 204 into the memory tmpImgBuf_A reserved for image data. The CPU 202 also copies the simplified explanatory image data 1002 into the memory tmpImgBuf_B reserved for image data and proceeds to S1123. In a case where no lock lever position error occurs in S1121, the CPU 202 proceeds to S1131 and copies the detailed explanatory image data 1003 for the electric circuit abnormality error into the memory tmpImgBuf_A reserved for image data. The CPU 202 also copies the simplified explanatory image data 1004 into the memory tmpImgBuf_B reserved for image data and proceeds to S1123.

In S1123, the CPU 202 determines whether a mode designated by a user is a JPEG scan. The CPU 202 proceeds to S1124 in a case where the mode is a JPEG scan and proceeds to S1132 in a case where the mode is not a JPEG scan. The image data transmitted in S1125 is not combined with the two-dimensional code.

As described above, in the configuration of transmitting explanatory image data to the host computer instead of document image data in a case where an abnormality in the image reading apparatus 100 is detected, the explanatory image data can be changed or scaled up (or scaled down) according to the mode setting. Thus, in a case where the mode setting designates a RAW scan, the two-dimensional code is combined with the explanatory image data, and in a case where the mode setting designates a JPEG scan, the two-dimensional code is not combined with the explanatory image data. As a result, even in a system dependent on the operating system standard driver incapable of treating information concerning an individual hardware configuration of the apparatus, a user can be informed of the status of the image reading apparatus.

Fourth Embodiment

A fourth embodiment of the present invention will be described with reference to the drawings. Since a basic configuration of the present embodiment is the same as that of the first embodiment, only a characteristic configuration will be described below.

A scan command issued by a user can set the resolution of a read image. The explanatory image data can be changed or scaled up (or scaled down) according to the condition of the set resolution. In a case where the resolution set by the scan command is high, it is possible to provide a display making the most of the resolution. In a case where the resolution is low, it is only necessary to provide a stripped-down display. Thus, in the present embodiment, an explanatory image to be displayed in the event of an error is changed according to the resolution set by a read command. The method will be described below.

Figure 12A:
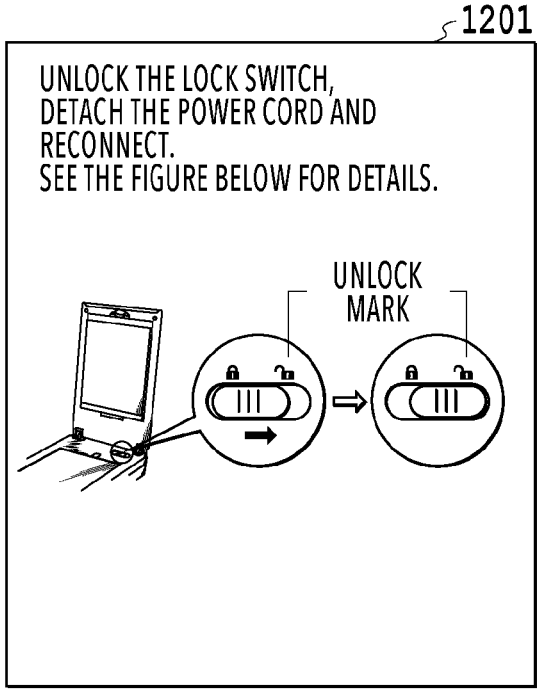
FIG. 12A is a diagram showing an image of explanatory image data to be transmitted to the host computer.
Figure 12B:
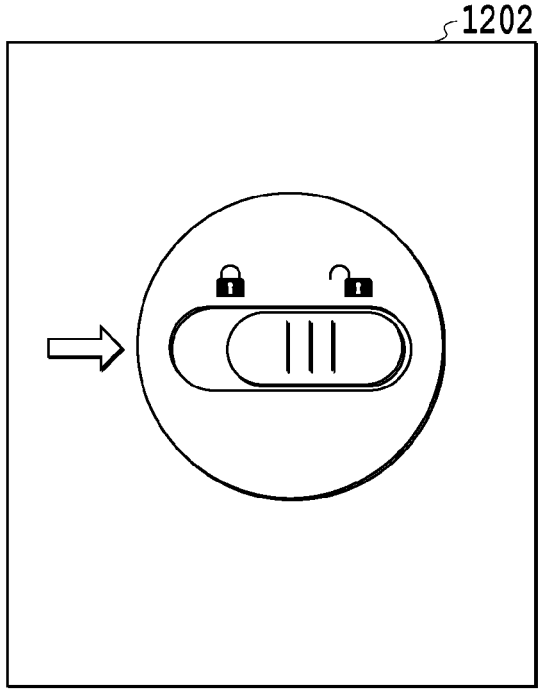
FIG. 12B is a diagram showing an image of explanatory image data to be transmitted to the host computer.
Figure 12C:
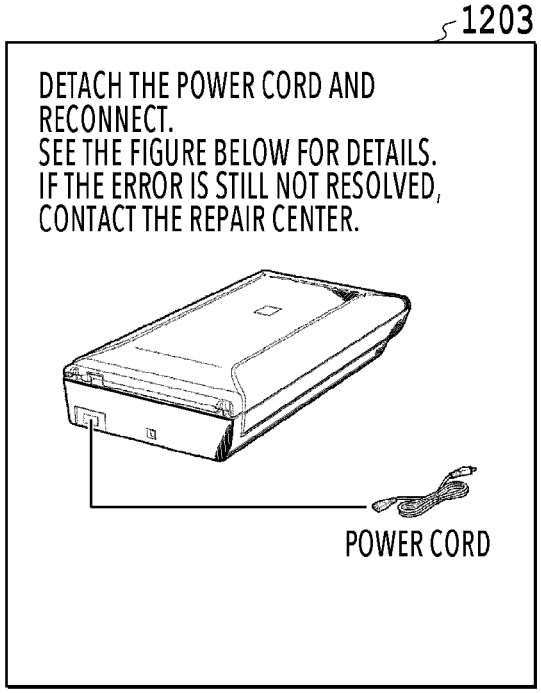
FIG. 12C is a diagram showing an image of explanatory image data to be transmitted to the host computer.
Figure 12D:
FIG. 12D is a diagram showing an image of explanatory image data to be transmitted to the host computer.

FIG. 12A to FIG. 12D are diagrams showing images of explanatory image data to be transmitted to the host computer 212. FIG. 12A shows explanatory image data 1201 transmitted in a case where a lock lever position error occurs. FIG. 12B shows explanatory image data 1202 transmitted in a case where a lock lever position error occurs and a resolution lower than a predetermined value (such as 150 dpi) is set. FIG. 12C shows explanatory image data 1203 transmitted in a case where an abnormality occurs in the electric circuit. FIG. 12D shows explanatory image data 1204 transmitted in a case where an abnormality occurs in the electric circuit and a resolution lower than the predetermined value is set.

Figure 13A:
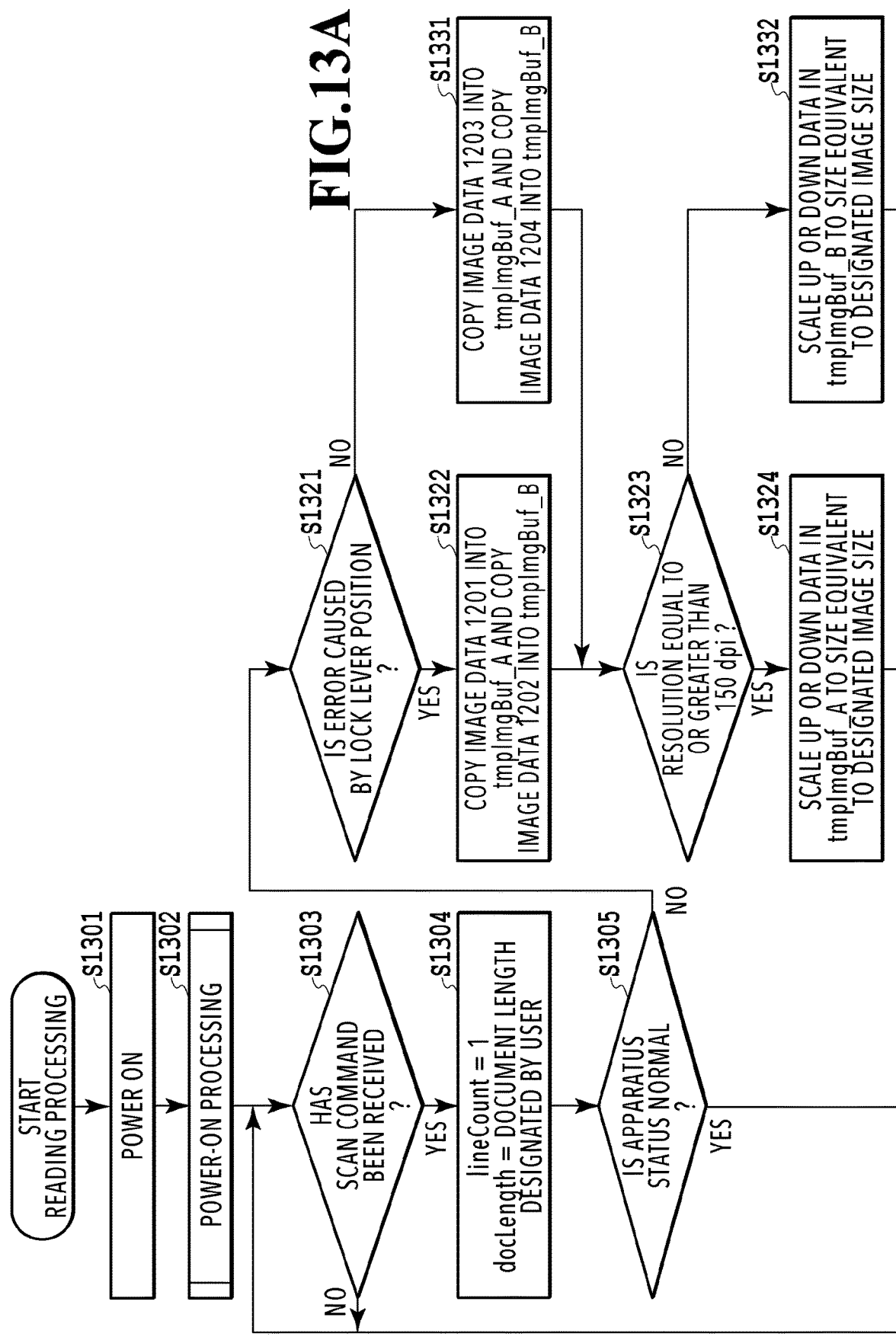
FIGS. 13A and 13B are flowcharts showing reading processing.
Figure 13B:
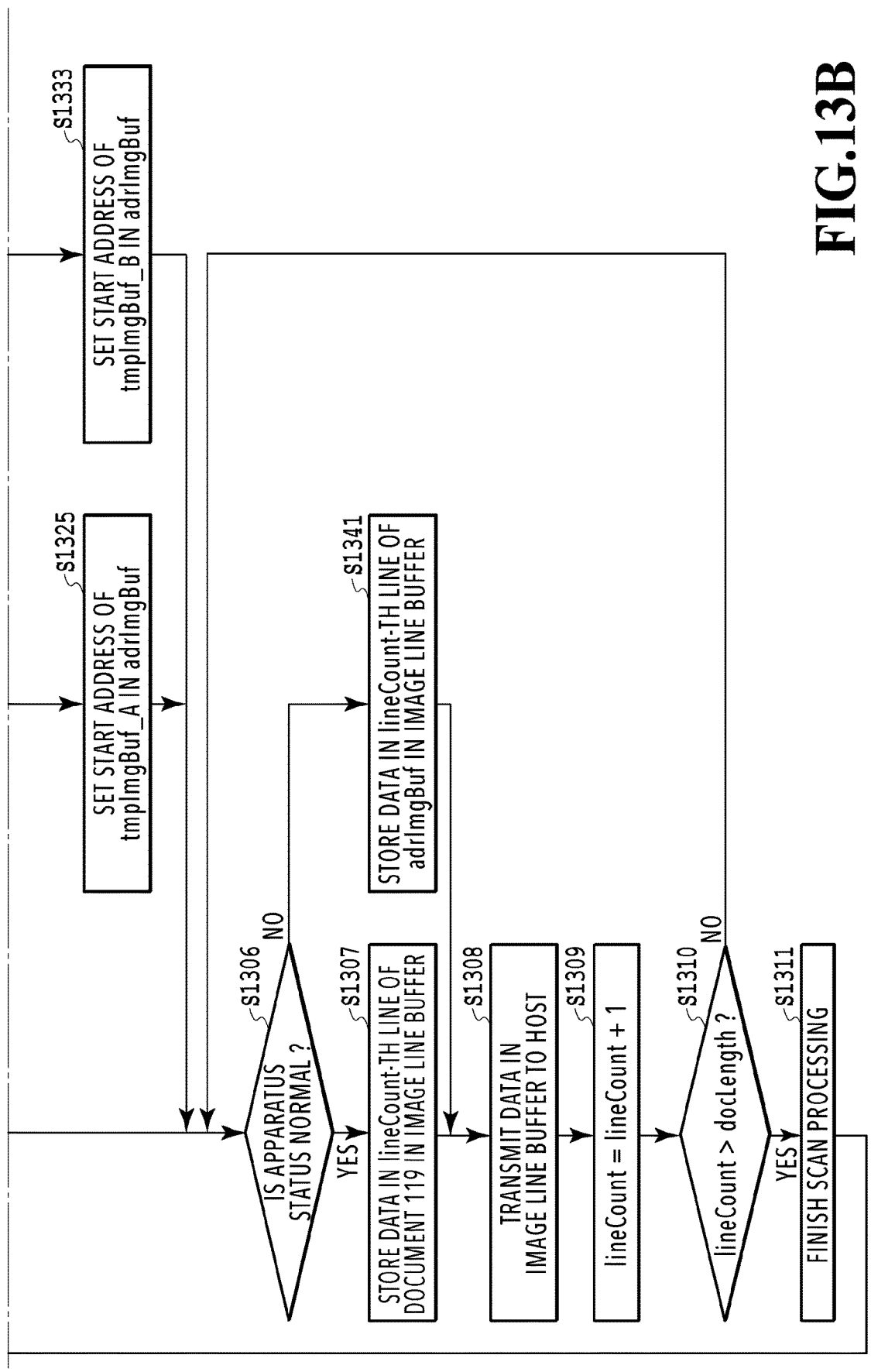

FIGS. 13A and 13B are flowcharts showing reading processing, which is a characteristic configuration of the present embodiment. The reading processing of the present embodiment will be described below with reference to the flowchart. The reading processing of the present embodiment is substantially identical to the reading processing of the second embodiment described with reference to FIG. 9A, except for the processing from S921 to S923 (corresponding to the processing from S1321 to S1323 in FIG. 13A). The processing different from the second embodiment will be described below and the description of the same processing will be omitted.

In a case where a lock lever position error occurs, the CPU 202 copies the detailed explanatory image data 1201 for the lock lever position error stored in the ROM 204 into the memory tmpImgBuf_A reserved for image data (S1322). The CPU 202 also copies the simplified explanatory image data 1202 into the memory tmpImgBuf_B reserved for image data and proceeds to S1323. In a case where no lock lever position error occurs, the CPU 202 proceeds to S1331 and copies the detailed explanatory image data 1203 for the electric circuit abnormality error into the memory tmpImgBuf_A reserved for image data. The CPU 202 also copies the simplified explanatory image data 1204 into the memory tmpImgBuf_B reserved for image data and proceeds to S1323.

In S1323, the CPU 202 determines whether a resolution designated by a user is equal to or greater than 150 dpi. The CPU 202 proceeds to S1324 in a case where the resolution is equal to or greater than 150 dpi and proceeds to S1332 in a case where the resolution is less than 150 dpi.

As described above, in the configuration of transmitting explanatory image data to the host computer 212 instead of document image data in a case where an abnormality in the image reading apparatus 100 is detected, the explanatory image data is changed or scaled up (or scaled down) according to the resolution set by the scan command. In a case where a high resolution is set, a display making the most of the resolution is provided. In a case where a low resolution is set, a stripped-down display is provided. As a result, even in a system dependent on the operating system standard driver incapable of treating information concerning an individual hardware configuration of the apparatus, a user can be informed of the status of the image reading apparatus.

Fifth Embodiment

A fifth embodiment of the present invention will be described with reference to the drawings. Since a basic configuration of the present embodiment is the same as that of the first embodiment, only a characteristic configuration will be described below.

In the present embodiment, in a case where a predetermined abnormality occurs in the electric circuit of the image reading apparatus 100, the power is turned off without transmitting explanatory image data to the host computer 212. The method will be described below.

Figure 14A:
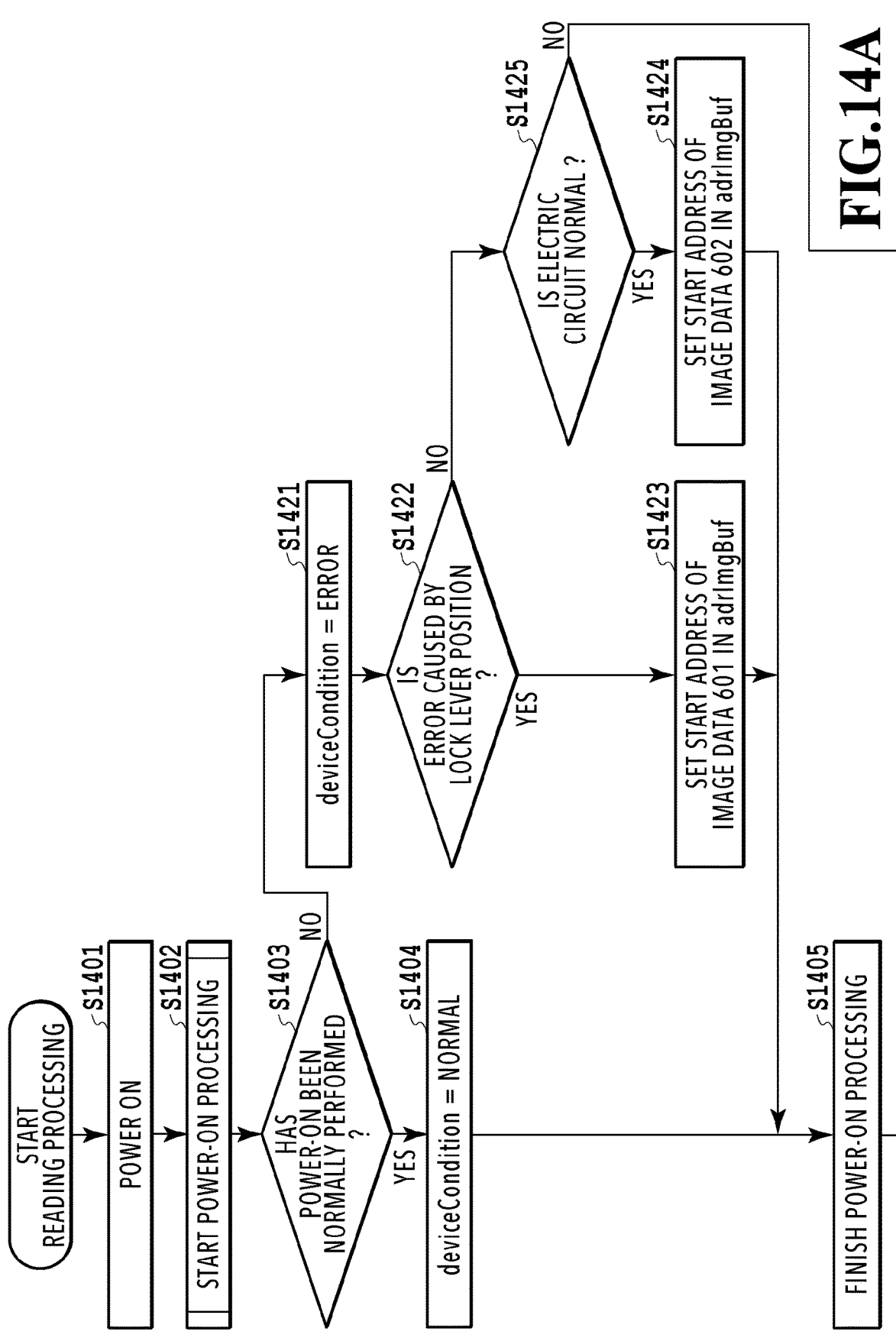
FIG. 14 is a diagram showing a relationship between FIGS. 14A and 14B.
Figure 14B:
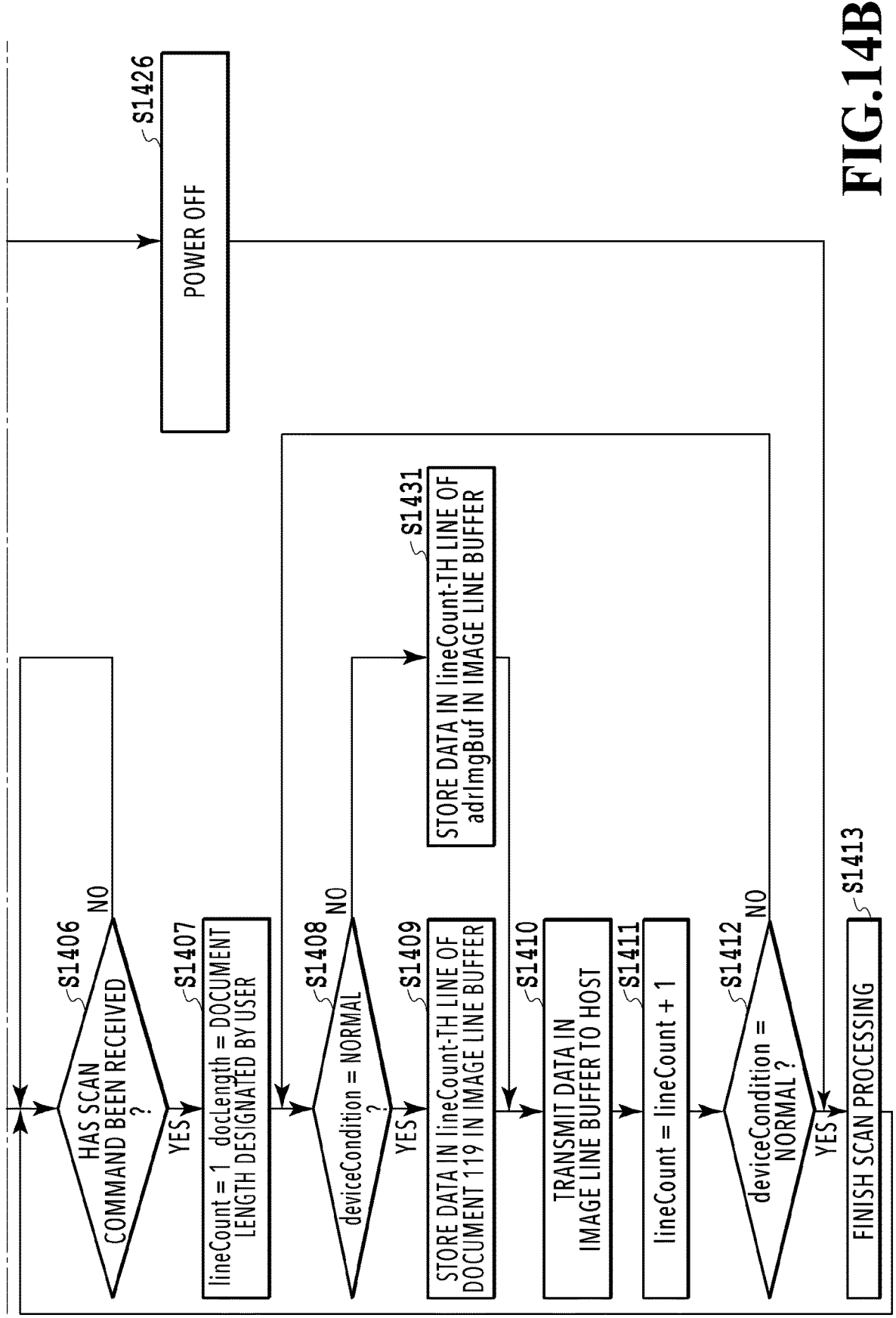

FIGS. 14A and 14B are flowcharts showing reading processing, which is a characteristic configuration of the present embodiment. The reading processing of the present embodiment will be described below with reference to the flowchart.

The processing from S1401 to S1422 in the reading processing of the present embodiment is the same as the processing from S701 to S722 of the first embodiment described with reference to FIG. 7A (corresponding to the processing from S1401 to S1422 in FIG. 14A). Thus, the description of the processing from S1401 to S1422 will be omitted.

In a case where a lock lever position error occurs, the CPU 202 proceeds to S1423, stores, in the variable adrImgBuf, the start address of the explanatory image data 601 (see FIG. 6A) for the lock lever position error stored in the ROM 204, and proceeds to S1405. In a case where no lock lever position error occurs, the CPU 202 proceeds to S1425 and determines whether a predetermined abnormality occurs in the electric circuit. In a case where no predetermined abnormality occurs in the electric circuit, the CPU 202 proceeds to S1424, stores, in the variable adrImgBuf, the start address of the explanatory image data 602 (see FIG. 6B) for the electric circuit abnormality error in the ROM 204, and proceeds to S1405. In a case where the CPU 202 determines that a predetermined abnormality occurs in the electric circuit in S1425, the CPU 202 turns off the power in S1426 without performing transmission processing and finishes the reading processing. The predetermined abnormality in the electric circuit is at least one error in the RAM 203 and the ROM 204, or an error in the USB I/F 209.

Since the processing from S1405 onward is the same as the processing from S706 onward of the first embodiment described with reference to FIG. 7B, the description thereof is omitted.

As described above, in a case where an abnormality in the image reading apparatus 100 is detected, the image reading apparatus 100 transmits explanatory image data corresponding to the abnormality to the host computer. Further, in a case where a predetermined abnormality occurs in the electric circuit of the image reading apparatus 100, the power is turned off without transmitting explanatory image data to the host computer 212. This can suppress a deterioration in the status of the apparatus.

Sixth Embodiment

A sixth embodiment of the present invention will be described with reference to the drawings. Since a basic configuration of the present embodiment is the same as that of the first embodiment, only a characteristic configuration will be described below.

FIG. 15 is a block diagram showing a hardware configuration of an image reading apparatus 1500. The configuration of the image reading apparatus 1500 of the present embodiment is a configuration obtained by adding a network I/F 1514 to the configuration of the image reading apparatus 100 of the first embodiment. The image reading apparatus 1500 can transfer digital image data stored in the RAM 203 to a host computer 1513 connected to a network via the network I/F 1514.

FIG. 16 is a configuration diagram showing a system in which a host computer 1612 is connected to the image reading apparatus 1500 via the USB I/F 209 and the host computer 1612 is further connected to an image reading apparatus 1510 via the network I/F 1514. The image reading apparatus 1500 and the image reading apparatus 1510 have the same configuration. The image reading apparatus 1500 can transmit image data to the host computer 1612 via the USB I/F 209. The image reading apparatus 1510 can transmit image data to the host computer 1612 via the network I/F 1514.

A scanner driver 1603 is software that runs on an operating system 1601. Upon receipt of a command from an application 1602, the scanner driver 1603 communicates with the image reading apparatus 1500 via the USB I/F 209 according to a predetermined communication protocol 1605, thereby transmitting a command such as a scan operation command and receiving digital image data and apparatus status information. The scanner driver 1603 can also communicate with the image reading apparatus 1510 via the network I/F 1514 according to a predetermined communication protocol 1606, thereby transmitting a command such as a scan operation command and receiving digital image data and apparatus status information.

As described above, the image reading apparatus 1500 of the present embodiment can be connected to a plurality of host computers. It is also possible to connect a plurality of image reading apparatus 1500 to one host computer and perform reading processing. In the present embodiment, in such a system configuration that a plurality of image reading apparatus 1500 are connected to one host computer, explanatory image data to be transmitted to the host computer is changed depending on whether the connection is network connection or USB connection. The present embodiment is based on the premise that a plurality of image reading apparatus are connected to one host computer and the image reading apparatus connected via the network I/F 1514 is an image reading apparatus numbered 9 provided in a shared space.

FIG. 17A to FIG. 17D are diagrams showing images of explanatory image data to be transmitted to the host computer. FIG. 17A shows explanatory image data 1701 transmitted in a case where a lock lever position error occurs and a scan instruction is received via the USB. FIG. 17B shows explanatory image data 1702 transmitted in a case where a lock lever position error occurs and a scan instruction is received via the network. FIG. 17C shows explanatory image data 1703 transmitted in a case where an abnormality occurs in the electric circuit and a scan instruction is received via the USB. FIG. 17D shows explanatory image data 1704 transmitted in a case where an abnormality occurs in the electric circuit and a scan instruction is received via the network.

FIGS. 18A and 18B are flowcharts showing reading processing, which is a characteristic configuration of the present embodiment. The reading processing of the present embodiment will be described below with reference to the flowchart.

The reading processing of the present embodiment is substantially identical to the reading processing of the second embodiment described with reference to FIG. 9A, except for the processing from S921 to S923 (corresponding to the processing from S1821 to S1823 in FIG. 18A). The processing different from the second embodiment will be described below and the description of the same processing will be omitted.

In a case where a lock lever position error occurs, the CPU 202 proceeds to S1822 and copies the detailed explanatory image data 1701 for the lock lever position error stored in the ROM 204 into the memory tmpImgBuf_A reserved for image data. The CPU 202 also copies the simplified explanatory image data 1702 into the memory tmpImgBuf_B reserved for image data and proceeds to S1823. In a case where no lock lever position error occurs, the CPU 202 proceeds to S1831 and copies the detailed explanatory image data 1703 for the electric circuit abnormality error into the memory tmpImgBuf_A reserved for image data. The CPU 202 also copies the simplified explanatory image data 1704 into the memory tmpImgBuf_B reserved for image data and proceeds to S1823.

In S1823, the CPU 202 determines whether the connection interface of the image reading apparatus 1500 is the USB I/F 209. The CPU 202 proceeds to S1824 in a case where the CPU 202 determines that the connection is made via the USB I/F 209 and proceeds to S1832 in a case where the connection is not made via the USB I/F 209.

As described above, in the basic configuration of transmitting explanatory image data to the host computer in a case where an abnormality in the image reading apparatus is detected, the explanatory image data to be transmitted to the host computer is changed according to whether the interface is the USB I/F 209 or the network I/F 1514. As a result, for example, in a case where the host computer 1612 is connected to a plurality of image reading apparatus via the network, a user can see the explanatory image shown in FIG. 17B or FIG. 17D. The user can thus easily identify an image reading apparatus in which the error has occurred.

Seventh Embodiment

A seventh embodiment of the present invention will be described with reference to the drawings. Since a basic configuration of the present embodiment is the same as that of the first embodiment, only a characteristic configuration will be described below.

In each of the above embodiments, the configuration of confirming the status of the image reading apparatus has been described based on the premise that the operating system standard driver of the host computer is used. In the present embodiment, a configuration considering a case where a dedicated scanner driver corresponding to an individual hardware configuration of the image reading apparatus can be used will be described.

In a case where a dedicated scanner driver corresponding to an individual hardware configuration of the image reading apparatus can be used, information indicating the status of the image reading apparatus is transmitted to the host computer by the dedicated scanner driver. Thus, if explanatory image data used in a case where an abnormality occurs and there is no dedicated scanner driver is transmitted to the host computer in spite of the fact that the dedicated scanner driver is used, there arises a problem of double display in the host computer. Thus, in the present embodiment, in a case where the dedicated scanner driver can be used, explanatory image data is not transmitted to the host computer. The method will be described below.

FIGS. 19A and 19B are flowcharts showing reading processing, which is a characteristic configuration of the present embodiment. The reading processing of the present embodiment will be described below with reference to the flowchart. The reading processing of the present embodiment is substantially identical to the reading processing of the first embodiment described with reference to FIG. 7B, except for the processing from No in the branch of S708 to S731 (corresponding to the processing from S1908 to S1931 in FIG. 19B). The processing different from the first embodiment will be described below and the description of the same processing will be omitted.

In a case where the CPU 202 determines that deviceCondition is not NORMAL, the CPU 202 proceeds to S1941 and determines whether the operating system (OS) standard communication protocol is used. In a case where the OS standard communication protocol is used, the CPU 202 proceeds to S1931. In a case where the OS standard communication protocol is not used, the CPU 202 finishes the reading processing without transmitting explanatory image data.

As described above, in the basic configuration of transmitting explanatory image data to the host computer in a case where an abnormality in the image reading apparatus is detected, the explanatory image data is not transmitted if the OS standard communication protocol is not used. As a result, in a case where the operating system standard communication protocol is not used, the possibility of double display of explanatory image data and a screen corresponding to the occurred error can be reduced.

Other Embodiments

In the above embodiments, the lock lever position error and the electric circuit abnormality are described as an example. However, the present invention is also applicable to other errors such as a paper jamming error in the image reading apparatus and an error in the light emitting unit.

Further, the image reading apparatus may determine which of explanatory image data and an error code is transmitted depending on the type of occurred error. For example, in a case where a lock lever position error occurs, the image reading apparatus transmits explanatory image data concerning the lock lever position error to the host computer. On the other hand, in a case where a paper jamming error occurs, the image reading apparatus may transmit an error code indicating paper jamming to the host computer.

Further, the above embodiments may be performed in an apparatus different from the image reading apparatus. For example, the embodiments may be performed in a multi-function apparatus (MFP) having various functions such as an image reading function and a print function. Further, although a scan is instructed using the operating system standard driver software in the above embodiments, the present invention is not limited to this. For example, a scan may be instructed using driver software for the image reading apparatus 100 included with the image reading apparatus 100.

The present invention can also be implemented by processing of supplying a program implementing one or more functions of the above embodiments to a system or apparatus via a network or storage medium and causing one or more processors in a computer of the system or apparatus to read and execute the program. Further, the present invention can also be implemented by a circuit that implements one or more functions (such as an ASIC).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-096230 filed May 22, 2019, which is hereby incorporated by reference herein in its entirety.

What is claimed is:

1. An image reading apparatus connectable to an information processing apparatus comprising predetermined software, the image reading apparatus comprising:
at least a processor and at least a memory coupled to the processor and having stored thereon instructions, wherein the instructions are executed by the processor to act as:
a reading unit configured to perform scan processing for a document in a case where a read command transmitted from the information processing apparatus by user operation to the predetermined software is received;
a detection unit configured to detect an error in the image reading apparatus; and
a transmission unit configured to execute image data transmission processing for transmitting image data corresponding to the detected error in a case where the detected error is a first error, and execute error transmission processing different from the image data transmission processing in a case where the detected error is a second error.

2. The image reading apparatus according to claim 1, wherein the instructions are further executed to act as:
a storage unit configured to store image data corresponding to a first error status and image data corresponding to a second error status; and
a selection unit configured to select the image data corresponding to the first error status in a case where the first error status is detected in the image reading apparatus and select the image data corresponding to the second error status in a case where the second error status is detected in the image reading apparatus.

3. The image reading apparatus according to claim 1, wherein the instructions are further executed to act as an image adjustment unit configured to scale up or down an image,
wherein the image adjustment unit scales up or down the image data corresponding to the error status according to a condition set by a user in a document read command.

4. The image reading apparatus according to claim 2, wherein the instructions are further executed to act as a setting unit configured to set a read mode,
wherein the selection unit selects the image data corresponding to the error status according to the set read mode.

5. The image reading apparatus according to claim 4, wherein the selection unit selects image data corresponding to the error status including a two-dimensional code in a case where a RAW scan is set as the read mode and selects image data corresponding to the error status not including a two-dimensional code in a case where a JPEG scan is set as the read mode.

6. The image reading apparatus according to claim 1, wherein the image data corresponding to the detected error status includes a two-dimensional code.

7. The image reading apparatus according to claim 1, wherein in a case where a read command is received from the predetermined software and an error status of the image reading apparatus is detected, the transmission unit transmits image data corresponding to the detected error status, and
in a case where a read command is received from software different from the predetermined software and an error status of the image reading apparatus is detected, the transmission unit transmits identification information indicating the error status.

8. The image reading apparatus according to claim 1, wherein the first error is an error that is not detected by the predetermined software, and the second error is a paper jamming error.

9. The image reading apparatus according to claim 8, wherein the instructions are executed to act as a restriction unit configured to restrict movement of the reading unit,
wherein an error that is not detected by the predetermined software is the error in which movement of the reading unit is restricted by the restriction unit.

10. The image reading apparatus according to claim 1, wherein an error code corresponding to the detected error is transmitted by error transmission processing different from the image data transmission processing.

11. The control method according to claim 9, further comprising restricting movement of the reading unit,
wherein an error that is not detected by the predetermined software is the error in which movement of the reading unit is restricted by the restriction unit.

12. A control method executed in an image reading apparatus connectable to an information processing apparatus comprising predetermined software, the method comprising:
performing scan processing for a document in a case where a reading command transmitted from the information processing apparatus by user operation to the predetermined software is received;
detecting an error status of the image reading apparatus;
executing image data transmission process for transmitting image data corresponding to the detected error in a case where the detected error is a first error, and executing error transmission processing different from the image data transmission processing in a case where the detected error is a second error.

13. The control method according to claim 12, wherein image data corresponding to a first error status and image data corresponding to a second error status are stored, and the image data corresponding to the first error status is selected in a case where the first error status is detected in the image reading apparatus and the image data corresponding to the second error status is selected in a case where the second error status is detected in the image reading apparatus.

14. The control method according to claim 12, wherein the image data corresponding to the error status is scaled up or down according to a condition set by a user in a document read command.

15. The control method according to claim 12, wherein the image data corresponding to the error status is selected according to a set read mode.

16. The control method according to claim 15, wherein image data corresponding to the error status including a two-dimensional code is selected in a case where a RAW scan is set as the read mode and image data corresponding to the error status not including a two-dimensional code is selected in a case where a JPEG scan is set as the read mode.

17. The control method according to claim 12, wherein the image data corresponding to the detected error status includes a two-dimensional code.

18. The control method according to claim 12, wherein in a case where a read command is received from the predetermined software and an error status of the image reading apparatus is detected, image data corresponding to the detected error status is transmitted, and in a case where a read command is received from software different from the predetermined software and an error status of the image reading apparatus is detected, identification information indicating the error status is transmitted.

19. The control method according to claim 12, wherein the image reading apparatus comprises a restriction unit configured to restrict movement of a reading unit, and the error status includes a status in which movement of the reading unit is restricted by the restriction unit.

20. The control method according to claim 12, wherein the first error is an error that is not detected by the predetermined software, and the second error is a paper jamming error.

21. The control method according to claim 12, wherein an error code corresponding to the detected error is transmitted by error transmission processing different from the image data transmission processing.

* * * * *